(12) United States Patent
Jang et al.

(10) Patent No.: US 12,216,879 B2
(45) Date of Patent: Feb. 4, 2025

(54) ELECTRONIC DEVICE HAVING A DIGITIZER WITH IMPROVED SHIELDING PERFORMANCE

(71) Applicant: Samsung Display Co., LTD., Yongin-si (KR)

(72) Inventors: Seokwon Jang, Yongin-si (KR); Hirotsugu Kishimoto, Yongin-si (KR); Chul Ho Jeong, Yongin-si (KR); Hyunjae Na, Yongin-si (KR); Sungguk An, Yongin-si (KR); Youngjin Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/421,502

(22) Filed: Jan. 24, 2024

(65) Prior Publication Data
US 2024/0319836 A1    Sep. 26, 2024

(30) Foreign Application Priority Data

Mar. 22, 2023 (KR) .......................... 10-2023-0037369

(51) Int. Cl.
*G06F 3/046* (2006.01)
*G06F 1/16* (2006.01)

(52) U.S. Cl.
CPC ............ *G06F 3/046* (2013.01); *G06F 1/1616* (2013.01); *G06F 2203/04102* (2013.01); *G06F 2203/04107* (2013.01)

(58) Field of Classification Search
CPC ................ G06F 1/1616; G06F 1/1641; G06F 2203/04017; G06F 3/0412; H10K 59/00–95; H10K 59/8792; H04M 1/0216; H04M 1/0214; H04M 1/0222; H04M 1/0218; H04M 1/022; H05K 9/0088; G09F 9/301

See application file for complete search history.

(56) References Cited

U.S. PATENT DOCUMENTS

| | | |
|---|---|---|
| 11,417,848 B2 | 8/2022 | Soh et al. |
| 11,449,179 B2 | 9/2022 | Shin et al. |
| 2022/0238821 A1 | 7/2022 | Cho et al. |

FOREIGN PATENT DOCUMENTS

| | | |
|---|---|---|
| KR | 101804579 B1 | 12/2017 |
| KR | 20200084495 A | 7/2020 |
| KR | 20210097258 A | 8/2021 |
| KR | 20220108846 A | 8/2022 |

*Primary Examiner* — Sanjiv D. Patel
(74) *Attorney, Agent, or Firm* — CANTOR COLBURN LLP

(57) ABSTRACT

A display module including a folding area, a first non-folding area, a second non-folding area and a digitizer that is disposed under the display module and that includes a sensing part including sensing coils and a shielding part disposed under the sensing part. The shielding part includes an adhesive layer including an opening overlapping the folding area, a first shielding layer disposed inside the adhesive layer and that includes a first folding portion overlapping the folding area and a first non-folding portion overlapping the first non-folding area, a second shielding layer disposed inside the adhesive layer and including a second folding portion overlapping the folding area and a second non-folding portion overlapping the second non-folding area, and a protective layer disposed under the adhesive layer, the first folding portion and the second folding portion overlap each other and are exposed by the opening.

20 Claims, 18 Drawing Sheets

FIG. 1B
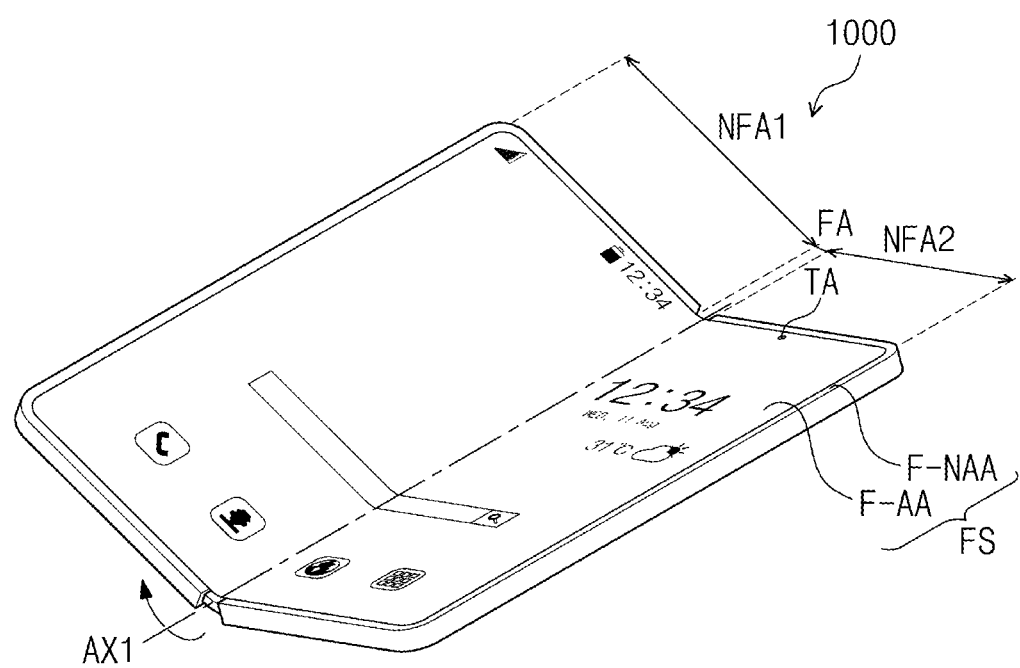
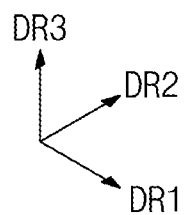

FIG. 1C
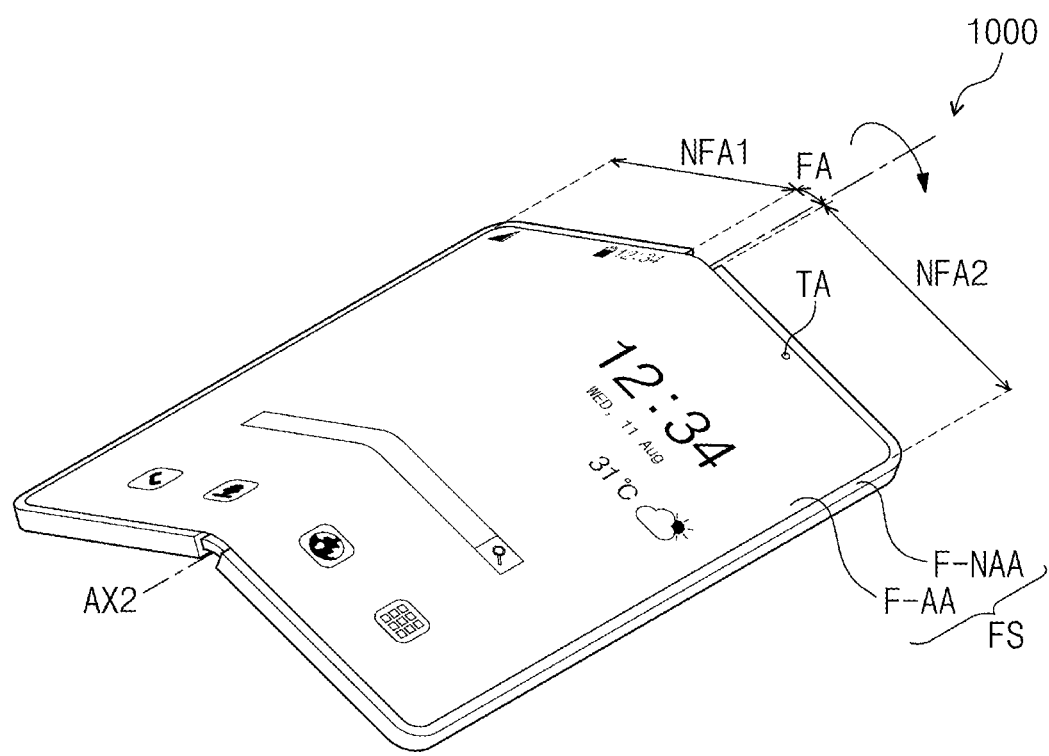
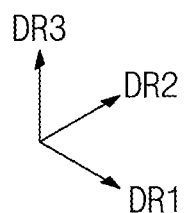

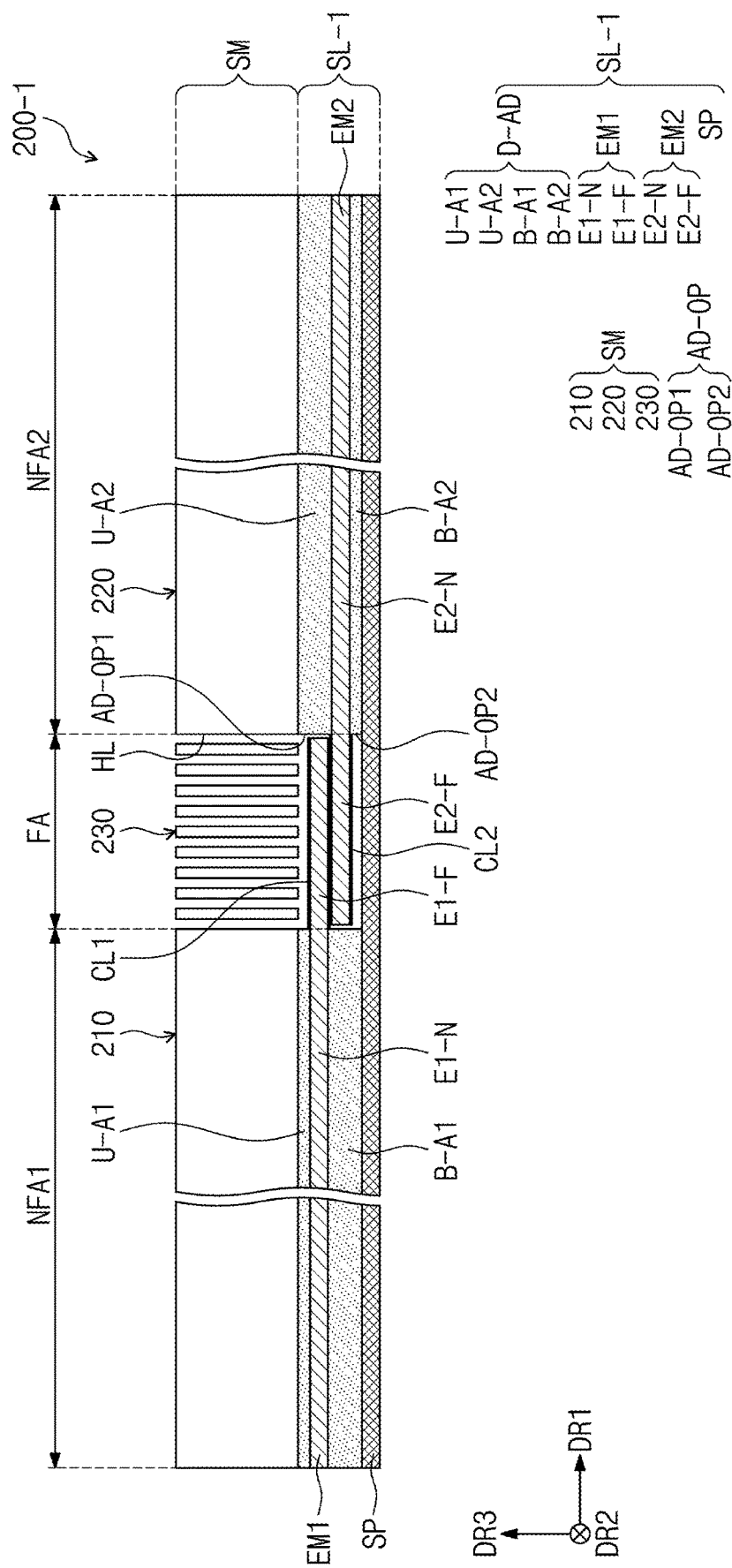

ELECTRONIC DEVICE HAVING A DIGITIZER WITH IMPROVED SHIELDING PERFORMANCE

This application claims priority to Korean Patent Application No. 10-2023-0037369, filed on Mar. 22, 2023, and all the benefits accruing therefrom under U.S.C. § 119, the content of which in its entirety is herein incorporated by reference.

BACKGROUND

1) Field

The present disclosure herein relates to an electronic device including a digitizer, and more particularly, to an electronic device including a digitizer having improved shielding performance.

2) Description of the Related Art

In the information society, the importance of electronic devices as visual information delivery media is emerging. The electronic devices are activated by electrical signals applied thereto. Each of the electronic devices includes a display layer that displays an image and a digitizer that senses an input applied from the outside.

The digitizer of the electronic device may include various sensing coils so as to be activated by an electrical signal. A region where the sensing coils are activated responds to a signal applied from the outside.

SUMMARY

The present disclosure provides an electronic device including a digitizer in which shielding performance in a folding part is improved.

According to an embodiment, an electronic device includes a display module including a folding area folded about a folding axis and a first non-folding area and a second non-folding area spaced apart from each other with the folding area therebetween and a digitizer that is disposed under the display module and that includes a sensing part that senses an external input and includes a plurality of sensing coils and a shielding part disposed under the sensing part. The shielding part includes an adhesive layer including an opening that overlaps the folding area, a first shielding layer that is disposed inside the adhesive layer and that includes a first folding portion that overlaps the folding area and a first non-folding portion that overlaps the first non-folding area, a second shielding layer that is disposed inside the adhesive layer and that includes a second folding portion that overlaps the folding area and a second non-folding portion that overlaps the second non-folding area, and a protective layer under the adhesive layer. The first folding portion and the second folding portion overlap each other and are exposed by the opening.

In an embodiment, when the folding area is folded, each of the first folding portion and the second folding portion may be bent with a predetermined curvature, and a part of the first folding portion and a part of the second folding portion may overlap each other.

In an embodiment, the adhesive layer may include a first upper adhesive layer that overlaps the first non-folding area and that is disposed between the first folding portion and the sensing part, a first lower adhesive layer that overlaps the first non-folding area and that is disposed between the first folding portion and the protective layer, a second upper adhesive layer that overlaps the second non-folding area and that is disposed between the second folding portion and the sensing part, and a second lower adhesive layer that overlaps the second non-folding area and that is disposed between the second folding portion and the protective layer. The opening may include a first opening defined between the first upper adhesive layer and the second upper adhesive layer and a second opening defined between the first lower adhesive layer and the second lower adhesive layer.

In an embodiment, when the folding area is folded, an end of the first folding portion may move away from a side surface of the second upper adhesive layer that defines the first opening, and an end of the second folding portion may move away from a side surface of the first lower adhesive layer that defines the second opening.

In an embodiment, at least one of an upper surface of the first folding portion that faces the sensing part and a lower surface of the first folding portion that faces the second folding portion may include a first coating layer formed by performing a release coating process, and at least one of an upper surface of the second folding portion that faces the first folding portion and a lower surface of the second folding portion that faces the protective layer may include a second coating layer formed by performing a release coating process.

In an embodiment, the electronic device may further include a reinforcing layer that is disposed between the first shielding layer and the second shielding layer and that overlaps the first non-folding area, the folding area, and the second non-folding area.

In an embodiment, the reinforcing layer may include one of polyimide and an elastomer.

In an embodiment, the electronic device may further include a first upper reinforcing layer disposed on an upper surface of the first shielding layer, a first lower reinforcing layer disposed on a lower surface of the first shielding layer, a second upper reinforcing layer disposed on an upper surface of the second shielding layer, and a second lower reinforcing layer disposed on a lower surface of the second shielding layer.

In an embodiment, the first upper reinforcing layer, the first lower reinforcing layer, the second upper reinforcing layer, and the second lower reinforcing layer may include one of polyimide and an elastomer.

In an embodiment, the first folding portion may have a smaller thickness than the first non-folding portion, and the second folding portion may have a smaller thickness than the second non-folding portion.

In an embodiment, an end of the first folding portion may face a side surface of the second non-folding portion disposed adjacent to the folding area, and an end of the second folding portion may face a side surface of the first non-folding portion disposed adjacent to the folding area.

In an embodiment, the protective layer may include holes that overlap the folding area and that are formed through the protective layer.

In an embodiment, the protective layer may overlap the folding area, the first non-folding area, and a portion of the second non-folding area adjacent to a boundary of the folding area, and the protective layer may not overlap the remaining portion of the second non-folding area.

In an embodiment, the first shielding layer and the second shielding layer may include one of magnetic metal powder (MMP), ferrite, invar, stainless steel, an Fe—Si—Al based alloy, and a Ni—Fe based alloy.

In an embodiment, when the folding area is folded with a predetermined radius of curvature, the radius of curvature may be greater than a gap between the first non-folding area and the second non-folding area.

In an embodiment, the sensing part may include a first non-folding part that overlaps the first non-folding area, a second non-folding part that overlaps the second non-folding area, and a folding part that overlaps the folding area and that is disposed between the first non-folding part and the second non-folding part, the folding part including holes formed through at least a portion of the folding part.

In an embodiment, the sensing part may include a first sensing part that overlaps the first non-folding area and a portion of the folding area and a second sensing part that overlaps the second non-folding area and a portion of the folding area, and the first sensing part and the second sensing part may be spaced apart from each other in the folding area.

In an embodiment, the electronic device may further include an upper plate that is disposed between the display module and the digitizer and that has holes defined therein to overlap the folding area.

In an embodiment, the protective layer may include one of stainless steel, polyimide, and an elastomer.

In an embodiment, the digitizer may sense the external input in an electromagnetic resonance (EMR) type.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. Accordingly, The above and other objects and features of the invention will become apparent by describing in detail embodiments thereof with reference to the accompanying drawings.

FIG. 1B is a perspective view illustrating a folding operation state of the electronic device, according to an embodiment.

FIG. 1C is a perspective view illustrating a folding operation state of the electronic device, according to an embodiment.

FIG. 8 is a cross sectional view of a digitizer, according to an embodiment.

DETAILED DESCRIPTION

Figure 1A:
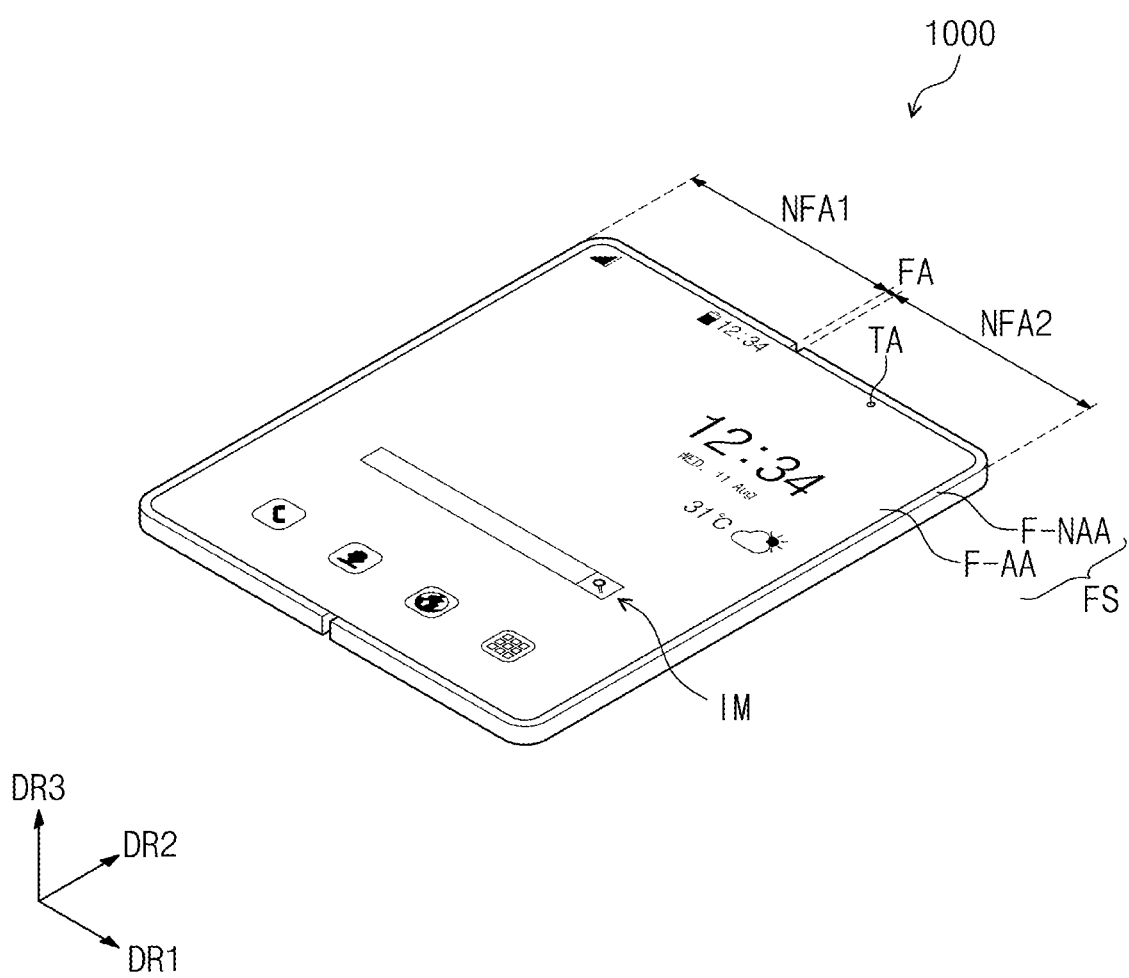
FIG. 1A is a perspective view illustrating an unfolded state of an electronic device, according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when it is mentioned that a component (or, an area, a layer, a part, etc.) is referred to as being related to another element such as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

The terminology used herein is for the purpose of describing particular embodiments only and is not intended to be limiting. As used herein, "a", "an," "the," and "at least one" do not denote a limitation of quantity, and are intended to include the plural forms as well, unless the context clearly indicates otherwise. Within the Figures and the text of the disclosure, a reference number indicating a singular form of an element may also be used to reference a plurality of the singular element.

Also, terms of "below", "on lower side", "above", "on upper side", or the like may be used to describe the relationships of the components shown in the drawings. The terms are used as a relative concept and are described with reference to the direction indicated in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein, including technical or scientific terms, have the same meanings as those generally understood by those skilled in the art to which the invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the invention will be described with reference to the accompanying drawings.

Figure 1D:
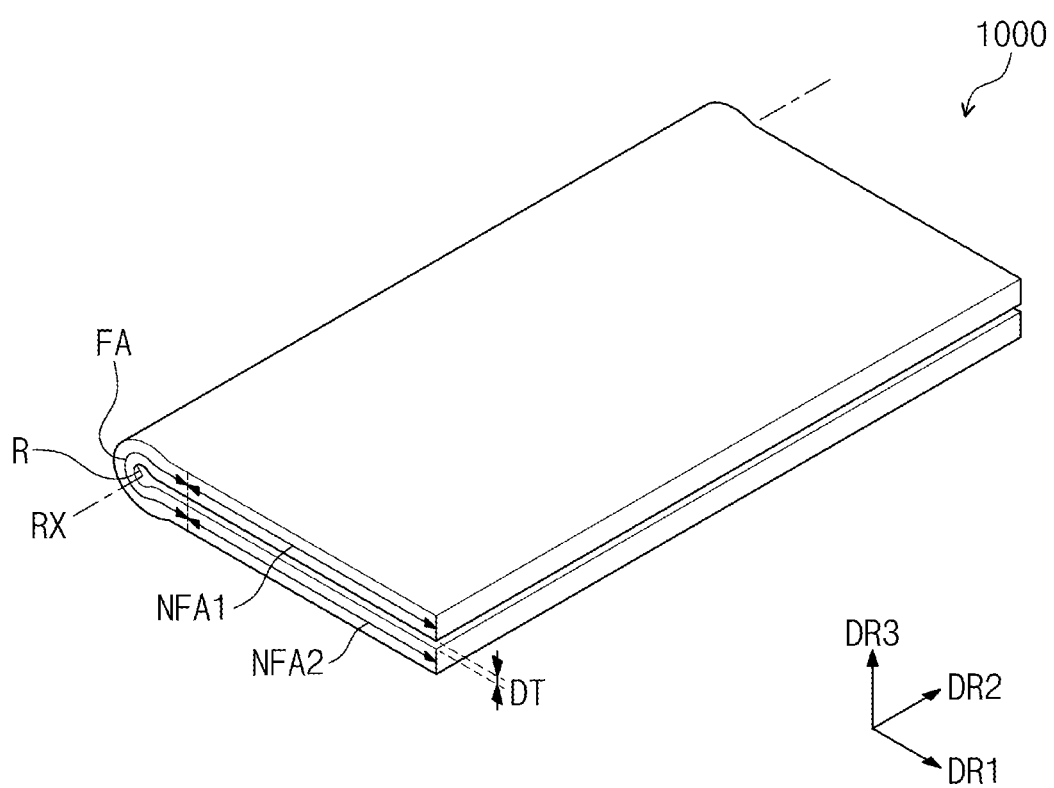
FIG. 1D is a perspective view illustrating a folded state of the electronic device, according to an embodiment.
Figure 1E:
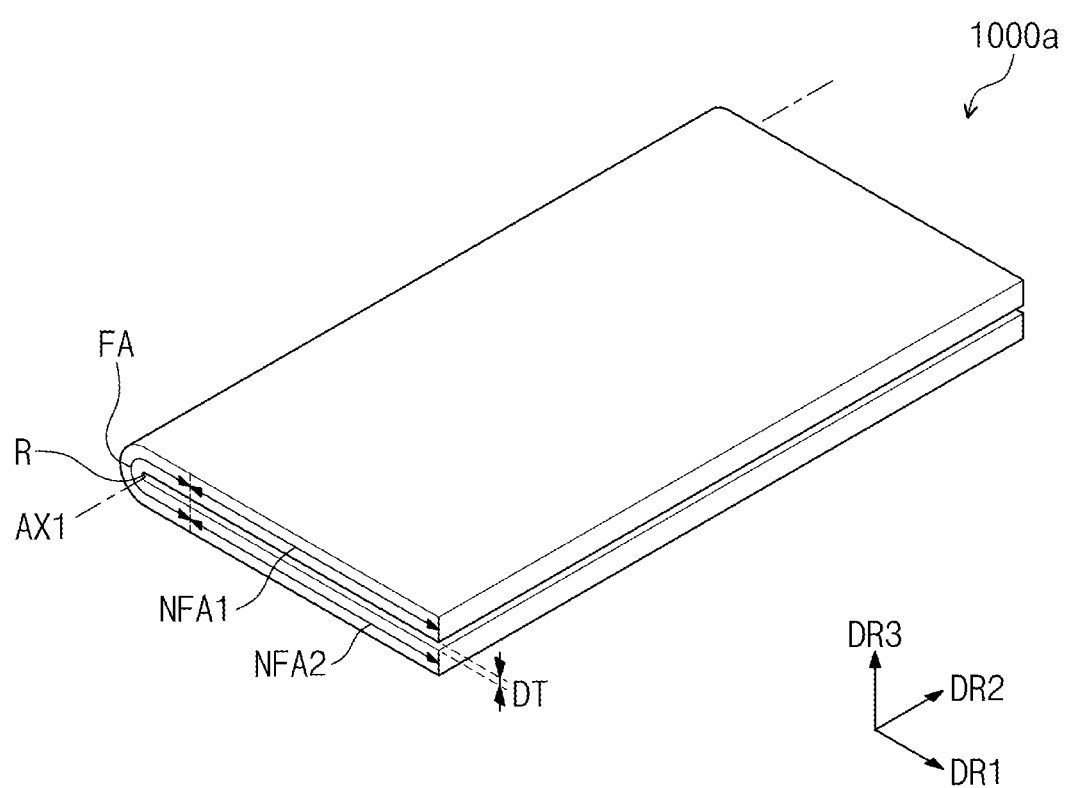
FIG. 1E is a perspective view illustrating a folded state of an electronic device, according to an embodiment.

FIG. 1A is a perspective view illustrating an unfolded state of an electronic device according to an embodiment. FIG. 1B is a perspective view illustrating a folding operation state of the electronic device according to an embodiment. FIG. 1C is a perspective view illustrating a folding operation state of the electronic device according to an embodiment. FIG. 1D is a perspective view illustrating a folded state of the electronic device according to an embodiment. FIG. 1E is a perspective view illustrating a folded state of an electronic device according to an embodiment.

Referring to FIGS. 1A to 1D, the electronic device 1000 according to an embodiment may be a device activated depending on an electrical signal. The electronic device 1000 may include various embodiments. For example, the electronic device 1000 may include a tablet computer, a notebook computer, a computer, a smart television, and/or the like. In this embodiment, the electronic device 1000 is illustrated as a smart phone.

In an embodiment, the electronic device 1000 may display an image IM in a third direction DR3 on a display surface FS directed parallel to a first direction DR1 and a second direction DR2. The display surface FS, on which the image IM is displayed, may correspond to a front surface of the electronic device 1000. The image IM may include not only a dynamic image but also a still image. In FIGS. 1A to 1C, an Internet search window and a clock window are illustrated as an example of the image IM.

According to an embodiment, front surfaces (or, upper surfaces) and rear surfaces (or, lower surfaces) of components are defined based on the direction in which the image IM is displayed in the unfolded state. The front surfaces and the rear surfaces may be disposed opposite each other in the third direction DR3, and the normal directions of the front surfaces and the rear surfaces may be directed parallel to the third direction DR3.

In an embodiment, the electronic device 1000 may sense an external input applied from the outside. The external input may be an input of a user. The input of the user may include various types of inputs such as a part of the user's body, an electromagnetic pen, light, heat, pressure, and/or the like. When the electronic device 1000 senses an input by an electromagnetic pen, the electronic device 1000 may include an input sensor that senses an input by a part of the user's body. In addition, the electronic device 1000 may further include a digitizer driven by a method using electromagnetic resonance (EMR).

In an embodiment, FIG. 1A illustrates the electronic device 1000 in the unfolded state. The display surface FS of the electronic device 1000 may include an active area F-AA and a peripheral area F-NAA. The peripheral area F-NAA is adjacent to the active area F-AA. The peripheral area F-NAA may have a lower light transmittance than the active area F-AA and may have a predetermined color.

According to an embodiment, the peripheral area F-NAA may surround the active area F-AA. Accordingly, the shape of the active area F-AA may be substantially defined by the peripheral area F-NAA. However, this is illustrative, and the peripheral area F-NAA may be disposed adjacent to only one side of the active area F-AA, or may be omitted.

In an embodiment, the display surface FS may further include a signal transmission area TA. The signal transmission area TA is illustrated as being included in the active area F-AA. However, without being limited thereto, the signal transmission area TA may be included in the peripheral area F-NAA, or may be surrounded by the active area F-AA and the peripheral area F-NAA.

In an embodiment, the signal transmission area TA may have a higher transmittance than the active area F-AA and the peripheral area F-NAA. Natural light, visible light, and/or infrared light may travel to the signal transmission area TA.

In an embodiment, the electronic device 1000 may further include a sensor that takes an external image through visible light passing through the signal transmission area TA and/or determines accessibility of an external object through infrared light passing through the signal transmission area TA. The sensor may overlap the signal transmission area TA. Accordingly, the electronic device 1000 including the sensor having improved reliability may be provided.

Referring to FIG. 1B, the electronic device 1000 according to an embodiment may be a foldable electronic device 1000. For example, the electronic device 1000 may be folded about a virtual first folding axis AX1 extending in the second direction DR2. The first folding axis AX1 may be formed above the display surface FS.

In an embodiment, the electronic device 1000 may include a folding area FA folded about the first folding axis AX1 of the electronic device 1000 and a first non-folding area NFA1 and a second non-folding area NFA2 spaced apart from each other in the first direction DR1 with the folding area FA disposed therebetween.

In an embodiment, the electronic device 1000 may be folded about the first folding axis AX1 in an in-folding manner such that the first non-folding area NFA1 and the second non-folding area NFA2 face each other.

In an embodiment and referring to FIG. 1C, the electronic device 1000 may be folded about a second folding axis AX2 in an out-folding manner such that the first non-folding area NFA1 and the second non-folding area NFA2 face away from each other. The second folding axis AX2 may be formed above a surface facing away from the display surface FS.

The electronic device 1000 according to an embodiment may be operated in only one manner selected from the in-folding manner and the out-folding manner with respect to folding axes extending on the same line. Alternatively, the electronic device 100 may be operated in the in-folding manner or the out-folding manner with respect to one folding axis.

Referring to FIG. 1D, when the electronic device 1000 according to an embodiment is folded in the in-folding manner, at least a portion of the folding area FA may have a predetermined curvature. The folding area FA may have a center of curvature RX disposed inward of the folding area FA, and the electronic device 1000 may be folded with a predetermined radius of curvature R about the center of curvature RX. According to an embodiment, the radius of curvature R may be greater than the gap DT between the first non-folding area NFA1 and the second non-folding area NFA2.

Referring to FIG. 1E, when folded in an in-folding manner, the electronic device 1000a according to an embodiment may be folded with a predetermined radius of curvature R. In this case, the gap DT between a portion extending from a folding area FA to a first non-folding area NFA1 and a portion extending from the folding area FA to a second non-folding area NFA2 may be constant in the first direction DR1 and is not limited to any one embodiment.

Figure 2:
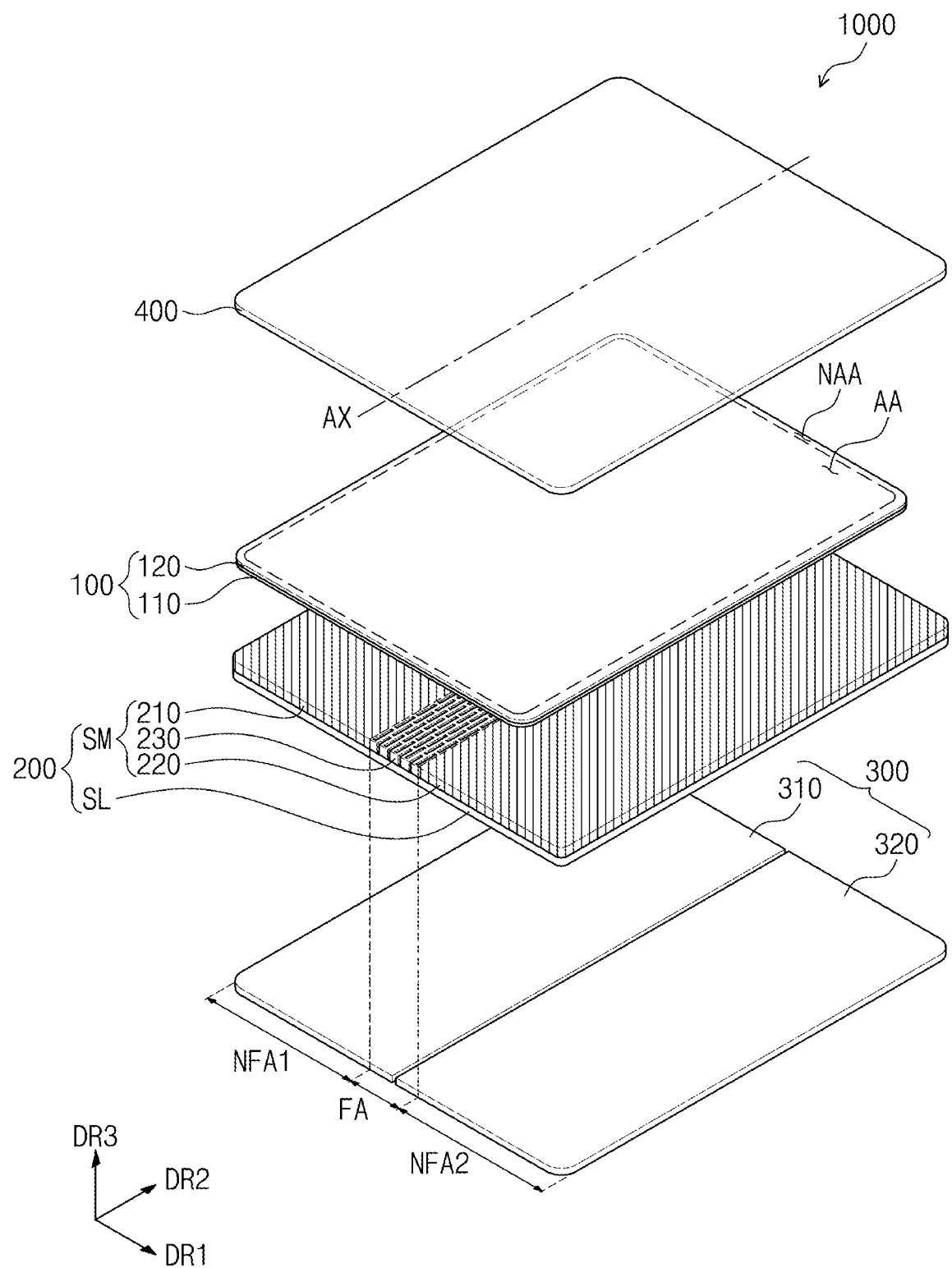
FIG. 2 is an exploded perspective view of an electronic device, according to an embodiment.
Figure 3:
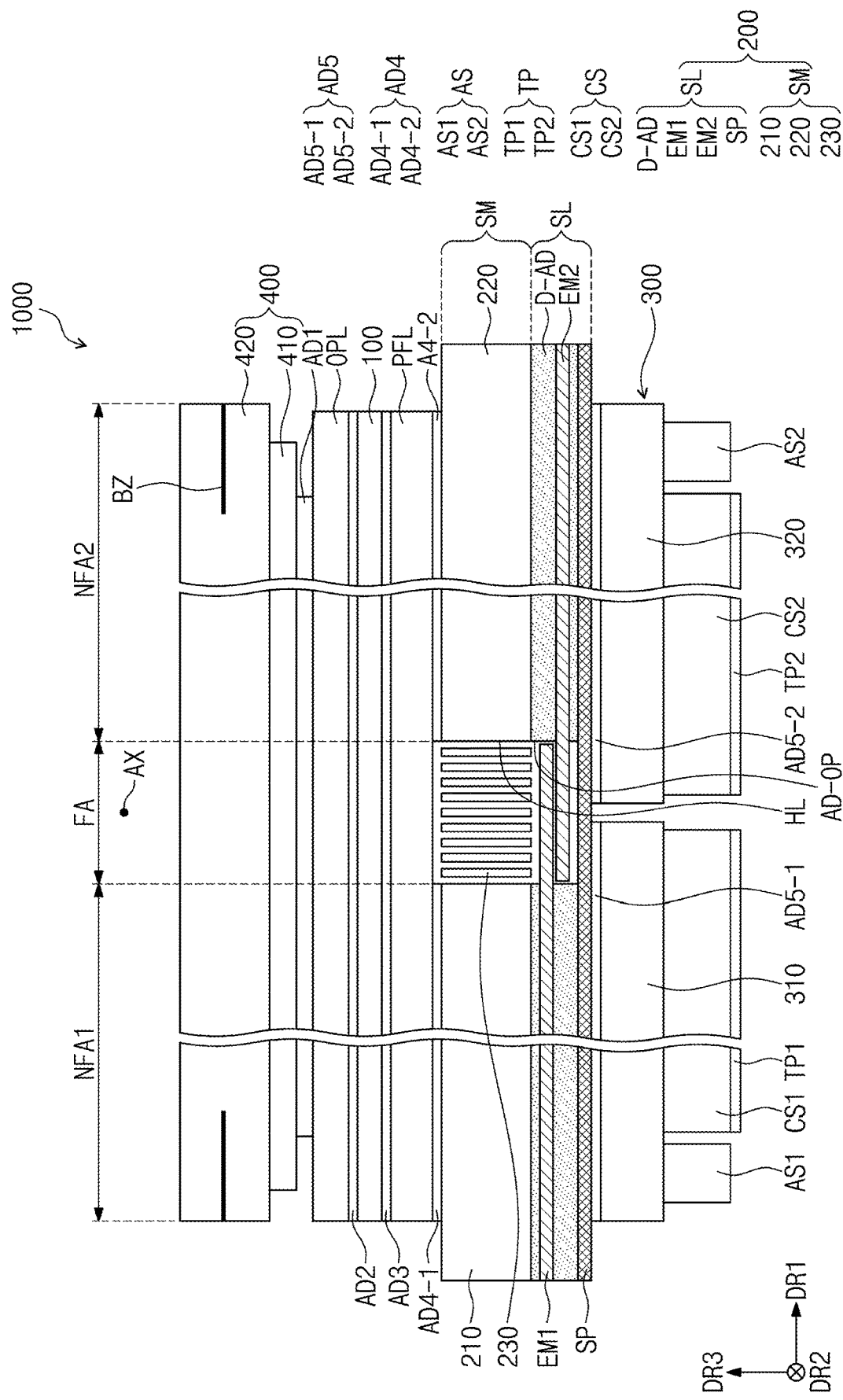
FIG. 3 is a cross sectional view of the electronic device, according to an embodiment.

FIG. 2 is an exploded perspective view of an electronic device according to an embodiment. FIG. 3 is a cross sectional view of the electronic device according to an embodiment. FIG. 2 illustrates only some of the components included in the electronic device 1000.

In an embodiment and referring to FIGS. 2 and 3, the electronic device 1000 may include a display module 100, a digitizer 200, a cushion layer 300, and a window 400. In more detail, the electronic device 1000 may include a plurality of adhesive layers AD1 to AD5, upper functional layers disposed between the display module 100 and the window 400, and lower functional layers disposed under the digitizer 200.

In an embodiment, the adhesive layers AD1 to AD5 to be described below may include one of an optical clear adhesive (OCA), an optical clear resin (OCR), and a pressure sensitive adhesive (PSA).

In an embodiment, the display module 100 may be flexible. An active area AA of the display module 100 may correspond to the active area F-AA of the electronic device 1000 illustrated in FIG. 1A, and a peripheral area NAA may correspond to the peripheral area F-NAA of the electronic device 1000.

In an embodiment, the display module 100 may include a display panel 110 that displays an image and an input sensor 120 that senses an external input. The display panel 100 may be an emissive display panel 110 and is not particularly limited. For example, the display panel 110 may be an organic light emitting display panel 110 or an inorganic light emitting display panel 110. A light emitting element of the organic light emitting display panel 110 may include an organic light emitting material. A light emitting element of the inorganic light emitting display panel 110 may include quantum-dots and/or quantum-rods. Furthermore, the display panel 110 according to an embodiment may include a micro LED element and/or a nano LED element and is not particularly limited.

In an embodiment, the display panel 110 may include a plurality of pixels, each of which includes one of the light emitting elements. Emissive layers included in the respective light emitting elements may be disposed in the active area AA and may emit predetermined colors. When a plurality of emissive layers are provided, light emitting elements may correspond to the emissive layers, respectively. Alternatively, when a single emissive layer is provided, the display panel 110 may further include color filters and/or color conversion members disposed on the emissive layer.

In an embodiment, the input sensor 120 may be disposed on the display panel 110. The input sensor 120 may be driven in a capacitive type. The input sensor 120 may sense the position and/or strength of an input applied by a user's hand over the entire active area F-AA (refer to FIG. 1A). The input sensor 120 may include sensing electrodes insulated from each other, routing lines connected to the corresponding sensing electrodes, and at least one sensing insulation layer.

The input sensor 120 according to an embodiment may be formed on the display panel 110 through a continuous process. In this case, the input sensor 120 may be expressed as being "directly disposed" on the display panel 110. When the input sensor 120 is directly disposed on the display panel 110, it may mean that a third component is not disposed between the input sensor 120 and the display panel 110. That is, a separate adhesive member may not be disposed between the input sensor 120 and the display panel 110. However, without being limited thereto, the input sensor 120 may be provided as a separate module and may be coupled with the display panel 110 through an adhesive layer.

In an embodiment, the digitizer 200 may be disposed under the display module 100. The digitizer 200 according to an embodiment may simultaneously perform a function of a protective member and a function of a sensing member that senses an external input. The digitizer 200 may sense an input by an electromagnetic pen. In this case, the digitizer 200 may be driven by a method using electromagnetic resonance (EMR).

According to an embodiment, the digitizer 200 may be disposed under the display module 100 and may support the display module 100. The digitizer 200 may include a sensing part SM and a shielding part SL. The sensing part SM may include a plurality of sensing coils capable of sensing electromagnetic induction of a stylus pen and one or more base layers on which the sensing coils are disposed. Each of the base layers may include a matrix part and a fiber reinforced composite disposed inside the matrix part. The fiber reinforced composite may be carbon fiber reinforced plastic (CFRP) and/or glass fiber reinforced plastic (GFRP). The matrix part may include a polymer resin. The matrix part may include a thermoplastic resin. The sensing coils may include one of copper and a copper alloy.

In an embodiment, the sensing part SM may include a first non-folding part 210 overlapping a first non-folding area NFA1, a second non-folding part 220 overlapping a second non-folding area NFA2, and a folding part 230 that overlaps a folding area FA and that is disposed between the first non-folding part 210 and the second non-folding part 220. In an embodiment, for convenience of description, the first non-folding part 210, the second non-folding part 220, and the folding part 230 are distinguished from one another. However, the first non-folding part 210, the second non-folding part 220, and the folding part 230 may be substantially provided as one body. Accordingly, the sensing coils included in the sensing part SM may be connected to one connector disposed on one side of the sensing part SM and may be connected to a main board through the connector.

According to an embodiment, the folding part 230 may include holes HL formed through the folding part 230 in the third direction DR3. The holes HL may correspond to the folding area FA and may be spaced apart from each other in the first direction DR1 and the second direction DR2. Since the digitizer 200 according to an embodiment includes the holes HL overlapping the folding area FA, the folding performance of the digitizer 200 may be improved. The folding part 230 may have a width of about 5 mm to about 20 mm in the first direction DR1.

In an embodiment, the shielding part SL may be disposed under the sensing part SM. The shielding part SL may block magnetic fields generated from components disposed under the digitizer 200. Accordingly, the sensing sensitivity of the digitizer 200 may be improved.

In an embodiment, the shielding part SL may include an adhesive layer D-AD, a first shielding layer EM1, a second shielding layer EM2, and a protective layer SP. The adhesive layer D-AD may include an opening AD-OP overlapping the folding area FA. The first shielding layer EM1 and the second shielding layer EM2 may be disposed inside the adhesive layer D-AD.

In an embodiment, the first shielding layer EM1 may overlap the first non-folding part 210 and the folding part 230. The second shielding layer EM2 may overlap the second non-folding part 220 and the folding part 230. The first shielding layer EM1 and the second shielding layer EM2 may be spaced apart from each other inside the adhesive layer D-AD.

In an embodiment, a portion of each of the first shielding layer EM1 and the second shielding layer EM2 may be disposed in the folding area FA. The portions of the first shielding layer EM1 and the second shielding layer EM2 that overlap the folding area FA may be exposed by the opening AD-OP of the adhesive layer D-AD.

In an embodiment, each of the first shielding layer EM1 and the second shielding layer EM2 may include one of magnetic metal powder (MMP), ferrite, invar, stainless steel, an Fe—Si—Al based alloy, and a Ni—Fe based alloy.

In an embodiment, the portions of the first shielding layer EM1 and the second shielding layer EM2 that overlap the folding area FA may be bent with a predetermined curvature when the folding area FA is folded. Since the portions of the first shielding layer EM1 and the second shielding layer EM2 that overlap the folding area FA are exposed by the opening AD-OP of the adhesive layer D-AD, the portions of the first shielding layer EM1 and the second shielding layer EM2 may slide within the opening AD-OP in the folding operation without a fixed portion. In an embodiment, the portions of the first shielding layer EM1 and the second shielding layer EM2 that overlap the folding area FA may require a protective layer capable of remaining in an initial state even though the folding operation is repeated.

The shielding part SL according to an embodiment may include the protective layer SP for preventing separation of the portions of the first shielding layer EM1 and the second shielding layer EM2, which overlap the folding area FA, in a folding operation of the electronic device 1000.

In an embodiment, the protective layer SP may be disposed under the adhesive layer D-AD. The protective layer SP may overlap the first non-folding area NFA1, the folding area FA, and the second non-folding area NFA2. The protective layer SP according to an embodiment may include one of stainless steel, polyimide, and an elastomer.

In an embodiment, the cushion layer 300 may be disposed under the digitizer 200. The cushion layer 300 may protect the display module 100 from an impact transmitted from below the display module 100. The cushion layer 300 may include expanded foam and/or a sponge. The expanded foam may include polyurethane foam and/or thermoplastic polyurethane foam. When the cushion layer 300 includes expanded foam, a barrier film may be added to the cushion layer 300 as a base layer, and the cushion layer 300 may be formed by causing a foaming agent to foam on the barrier film.

In an embodiment, the cushion layer 300 may include a first cushion layer 310 and a second cushion layer 320. The first cushion layer 310 may overlap one portion of the folding part 230 and the first non-folding part 210. The second cushion layer 320 may overlap another portion of the folding part 230 and the second non-folding part 220. The first cushion layer 310 and the second cushion layer 320 may be spaced apart from each other in the first direction DR1 in the folding area FA.

In an embodiment, the first cushion layer 310 and the second cushion layer 320 may prevent infiltration of foreign matter into the holes HL defined in the folding part 230 when the electronic device 1000 is folded. Even though the folding part 230 is folded with a predetermined curvature when the electronic device 1000 is folded, the shape of the digitizer 200 may be easily deformed since the first cushion layer 310 and the second cushion layer 320 are spaced apart from each other in the area overlapping the folding part 230.

In an embodiment, the window 400 may be disposed on the display module 100. The window 400 may include an optically clear material such that light provided by the display module 100 transmits through the window 400. The window 400 may provide the display surface FS (refer to FIG. 1A) of the electronic device 1000.

In an embodiment and referring to FIG. 3, the window 400 may include a first layer 410, a second layer 420, and a bezel pattern BZ. The first layer 410 may include glass. The second layer 420 may be disposed on the first layer 410. The second layer 420 may include a material having a lower modulus than the first layer 410. For example, the second layer 420 may be a film including an organic material. The second layer 420 may have a greater thickness than the first layer 410. Accordingly, the second layer 420 may protect an upper surface of the first layer 410.

In an embodiment, the second layer 420 may include at least one functional layer. The functional layer may include at least one of a window protection layer, an anti-fingerprint layer, and an anti-reflective layer.

In an embodiment, the window 400 may alleviate an external impact while transmitting an image from the display module 100, thereby preventing damage to or malfunction of the display module 100 due to the external impact.

The window 400 according to an embodiment may include thin glass and/or a synthetic resin film. When the window 400 includes thin glass, the window 400 may have a thickness of about 100 µm or less. For example, the window 400 may have a thickness of about 30 µm, but is not limited thereto.

In an embodiment, when the window 400 includes a synthetic resin film, the window 400 may include a polyimide (PI) film and/or a polyethylene terephthalate (PET) film.

In an embodiment, the window 400 may have a multilayer structure or a single-layer structure. For example, the window 400 may include a plurality of synthetic resin films coupled through an adhesive, or may include a glass substrate and a synthetic resin film coupled through an adhesive.

In an embodiment, the window 400 may be formed of a flexible material. Accordingly, the window 400 may be folded or unfolded about a folding axis AX. That is, when the electronic device 1000 repeats a folding operation, the shape of the window 400 may also be deformed to correspond to the digitizer 200.

In an embodiment, an optical layer OPL may be disposed between the display module 100 and the window 400. The optical layer OPL may be coupled with the window 400 through the first adhesive layer AD1. The optical layer OPL may be coupled with the display module 100 through the second adhesive layer AD2.

In an embodiment, the optical layer OPL may decrease the reflectance of external light. The optical layer OPL may include a stretchable synthetic resin film. For example, the optical layer OPL may be provided by dyeing a polyvinyl alcohol (PVA) film with an iodine compound. Alternatively, the optical layer OPL may include a color filter. As long as the optical layer OPL is capable of reducing the reflectance of external light, the optical layer OPL may include various layers and is not limited to any one embodiment.

In an embodiment, the panel protection layer PFL may be disposed between the display module 100 and the digitizer 200. The panel protection layer PFL and the display module 100 may be coupled by the third adhesive layer AD3. The panel protection layer PFL may be disposed under the display module 100 and may protect a lower portion of the display module 100. The panel protection layer PFL may include a flexible plastic material. For example, the panel protection layer PFL may include polyethylene terephthalate.

In an embodiment, the digitizer 200 and the panel protection layer PFL may be coupled by the fourth adhesive layer AD4. The fourth adhesive layer AD4 may include a first portion AD4-1 and a second portion AD4-2. The first portion AD4-1 and the second portion AD4-2 may be spaced apart from each other with the folding area FA therebetween.

In an embodiment, the first portion AD4-1 may couple the first non-folding part 210 and one portion of the panel protection layer PFL, and the second portion AD4-2 may couple the second non-folding part 220 and another portion of the panel protection layer PFL.

In an embodiment, the electronic device 1000 may further include a metal plate CS, an insulating layer TP, and a step compensation member AS that are disposed under the cushion layer 300. The metal plate CS may protect the display module 100 by absorbing an external impact. The metal plate CS may include stainless steel. The metal plate CS may include a first metal layer CS1 and a second metal layer CS2. The first metal layer CS1 may be coupled with the first cushion layer 310 by one portion AD5-1 of the fifth adhesive layer AD5, and the second metal layer CS2 may be coupled to the second cushion layer 320 by another portion AD5-2 of the fifth adhesive layer AD5.

In an embodiment, the insulting layer TP may be disposed under the metal plate CS. The insulating layer TP may prevent static electricity from flowing into the metal plate CS. The insulating layer TP may be an insulating film. The insulating layer TP may include a first insulating layer TP1 and a second insulating layer TP2, and the first insulating layer TP1 and the second insulating layer TP2 may be coupled to the first metal layer CS1 and the second metal layer CS2, respectively.

In an embodiment, the step compensation member AS may be coupled to a lower side of the cushion layer 300. The step compensation member AS may be a double-sided tape and/or an insulating film. The step compensation member AS may include a first step compensation member AS1 and a second step compensation member AS2, and the first step compensation member AS1 and the second step compensation member AS2 may be coupled to the first cushion layer 310 and the second cushion layer 320, respectively.

The electronic device 1000 according to an embodiment may not include at least one of the metal plate CS, the insulating layer TP, and the step compensation member AS and is not limited to any one embodiment.

Figure 4:
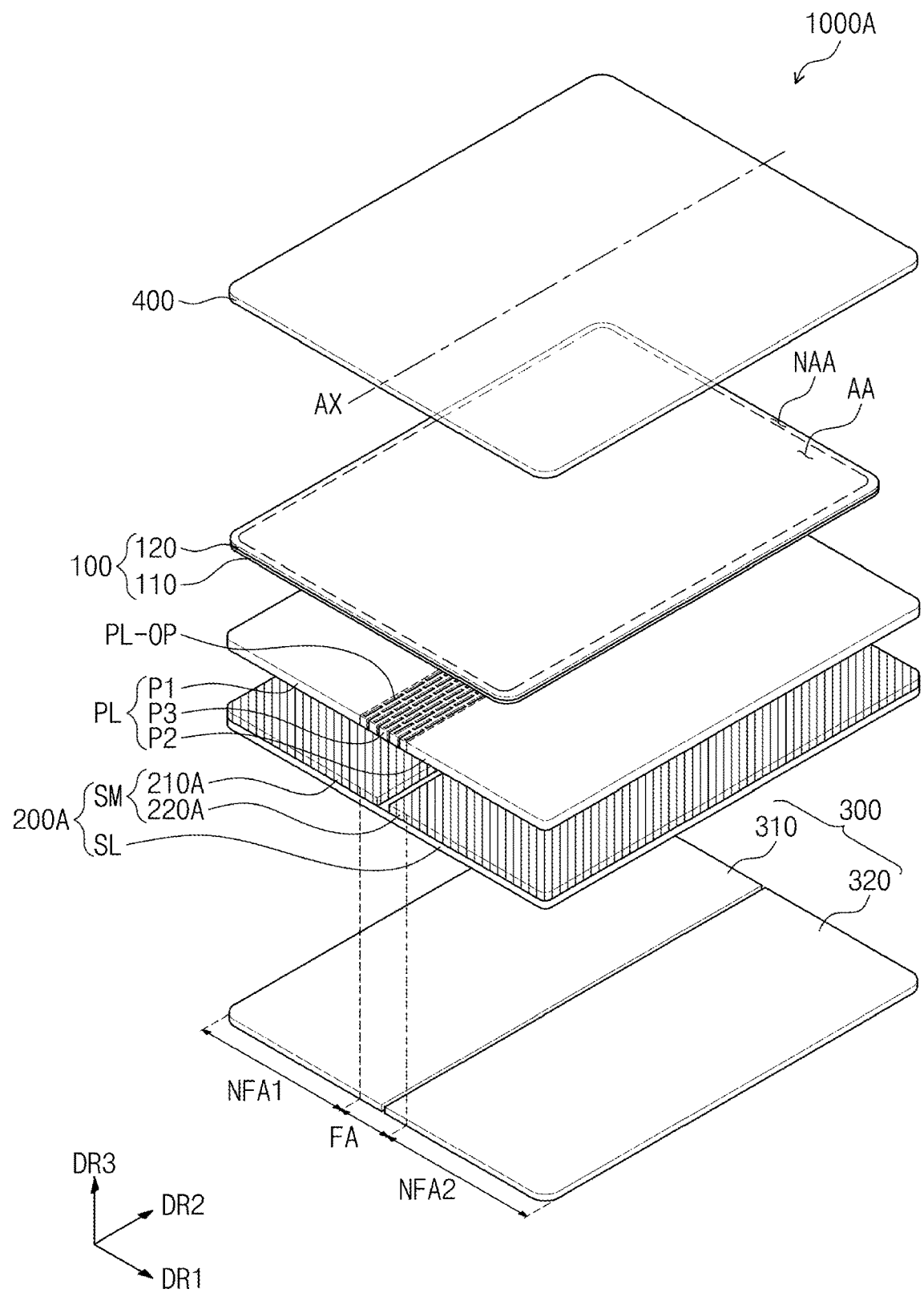
FIG. 4 is an exploded perspective view of an electronic device, according to an embodiment.
Figure 5:
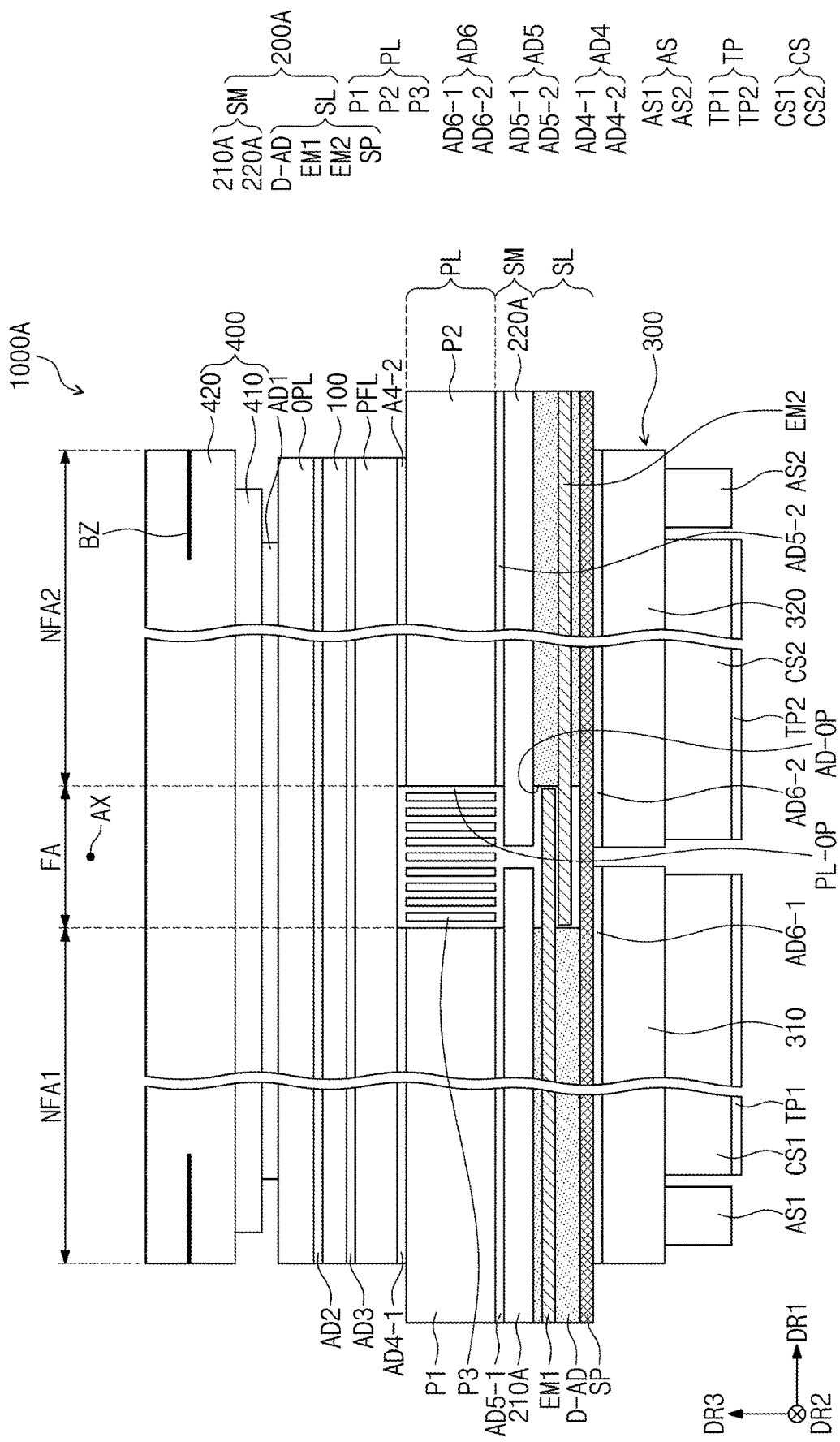
FIG. 5 is a cross sectional view of the electronic device, according to an embodiment.

FIG. 4 is an exploded perspective view of an electronic device according to an embodiment. FIG. 5 is a cross sectional view of the electronic device according to an embodiment. Components identical or similar to the components illustrated in FIGS. 1A to 3 will be assigned with identical or similar reference numerals, and repetitive descriptions will hereinafter be omitted.

Referring to FIG. 4 and FIG. 5, the electronic device 1000A according to an embodiment may include a display module 100, a digitizer 200A, a cushion layer 300, and a window 400. In more detail, the electronic device 1000A may include a plurality of adhesive layers AD1 to AD6, upper functional layers disposed between the display module 100 and the window 400, and lower functional layers disposed under the digitizer 200A. The remaining components other than the digitizer 200A among the components included in the electronic device 1000A may correspond to the components included in the electronic device 1000 of FIGS. 3 and 4, and the following description will be focused on the difference between the electronic device 1000A and the electronic device 1000 described with reference to FIGS. 3 and 4.

The electronic device 1000A according to an embodiment may include an upper plate PL and the digitizer 200A.

In an embodiment, the upper plate PL may include a first plate P1 overlapping a first non-folding area NFA1, a second plate P2 overlapping a second non-folding area NFA2, and a third plate P3 that overlaps a folding area FA and that is disposed between the first plate P1 and the second plate P2. In an embodiment, for convenience of description, the first plate P1, the second plate P2, and the third plate P3 are distinguished from one another. However, the first plate P1, the second plate P2, and the third plate P3 may be substantially provided as one body. The upper plate PL may include stainless steel. In an embodiment, the upper plate PL may include a function of a protective member that protects the display module 100.

In an embodiment, the upper plate PL and a panel protection layer PFL may be coupled by the fourth adhesive layer AD4. The fourth adhesive layer AD4 may include a first portion AD4-1 and a second portion AD4-2. The first portion AD4-1 and the second portion AD4-2 may be spaced apart from each other with the folding area FA therebetween.

In an embodiment, the first portion AD4-1 may couple the first plate P1 and one portion of the panel protection layer PFL, and the second portion AD4-2 may couple the second plate P2 and another portion of the panel protection layer PFL.

The digitizer 200A according to an embodiment may include a first sensing part 210A and a second sensing part 220A. The first sensing part 210A may overlap one portion of the folding area FA and the first non-folding area NFA1. The second sensing part 220A may overlap another portion of the folding area FA and the second non-folding area NFA2. The first sensing part 210A and the second sensing part 220A may be spaced apart from each other in the first direction DR1 in the folding area FA.

In an embodiment, sensing coils included in the first sensing part 210A may be connected to a first connector disposed on one side of the first sensing part 210A and may be connected to a main board through the first connector. Sensing coils included in the second sensing part 220A may be connected to a second connector disposed on one side of the second sensing part 220A and may be connected to the main board through the second connector separate from the first connector.

In an embodiment, however, without being limited thereto, the first sensing part 210A and the second sensing part 220A may be connected with each other in a portion of the folding area FA that overlaps the peripheral area F-NAA (refer to FIG. 1A). In an embodiment, the sensing coils included in the first sensing part 210A and the second sensing part 220A may be connected to the main board through one connector.

In an embodiment, a shielding part SL may be disposed under a sensing part SM. The shielding part SL may block magnetic fields generated from components disposed under the digitizer 200A. Accordingly, the sensing sensitivity of the digitizer 200A may be improved.

In an embodiment, the shielding part SL may include an adhesive layer D-AD, a first shielding layer EM1, and a second shielding layer EM2. The adhesive layer D-AD may include an opening AD-OP overlapping the folding area FA. The first shielding layer EM1 and the second shielding layer EM2 may be disposed inside the adhesive layer D-AD.

In an embodiment, the first shielding layer EM1 may overlap the first sensing part 210A and a portion of the second sensing part 220A that is adjacent to the folding area FA, and the second shielding layer EM2 may overlap the second sensing part 220A and a portion of the first sensing part 210A that is adjacent to the folding area FA. The first shielding layer EM1 and the second shielding layer EM2 may be spaced apart from each other inside the adhesive layer D-AD.

In an embodiment, a portion of each of the first shielding layer EM1 and the second shielding layer EM2 may be disposed in the folding area FA. The portions of the first shielding layer EM1 and the second shielding layer EM2 that overlap the folding area FA may be exposed by the opening AD-OP of the adhesive layer D-AD.

In an embodiment, the portions of the first shielding layer EM1 and the second shielding layer EM2 that overlap the folding area FA may be bent with a predetermined curvature when the folding area FA is folded. Since the portions of the first shielding layer EM1 and the second shielding layer EM2 that overlap the folding area FA are exposed by the opening AD-OP of the adhesive layer D-AD, the portions of the first shielding layer EM1 and the second shielding layer EM2 may slide within the opening AD-OP in the folding operation without a fixed portion. In an embodiment, the portions of the first shielding layer EM1 and the second shielding layer EM2 that overlap the folding area FA may require a protective layer capable of remaining in an initial state even though the folding operation is repeated.

The shielding part SL according to an embodiment may include a protective layer SP for preventing separation of the portions of the first shielding layer EM1 and the second shielding layer EM2, which overlap the folding area FA, in a folding operation of the electronic device 1000A.

In an embodiment, the protective layer SP may be disposed under the adhesive layer D-AD. The protective layer SP may overlap the first non-folding area NFA1, the folding area FA, and the second non-folding area NFA2. The protective layer SP according to an embodiment may include one of stainless steel, polyimide, and an elastomer.

In an embodiment, the digitizer 200A and the upper plate PL may be coupled by the fifth adhesive layer AD5. The fifth adhesive layer AD5 may include a first portion AD5-1 and a second portion AD5-2. The first portion AD5-1 and the second portion AD5-2 may be spaced apart from each other with the folding area FA therebetween.

In an embodiment, the first portion AD5-1 may couple the first plate P1 and the first sensing part 210A, and the second portion AD5-2 may couple the second plate P2 and the second sensing part 220A. The cushion layer 300 and the digitizer 200A may be coupled by the sixth adhesive layer AD6. The sixth adhesive layer AD6 may include a first portion AD6-1 and a second portion AD6-2. The first portion AD6-1 and the second portion AD6-2 may be spaced apart from each other with the folding area FA therebetween.

In an embodiment, the first portion AD6-1 may couple the first sensing part 210A and a first cushion layer 310, and the second portion AD6-2 may couple the second sensing part 220A and a second cushion layer 320.

Figure 6:
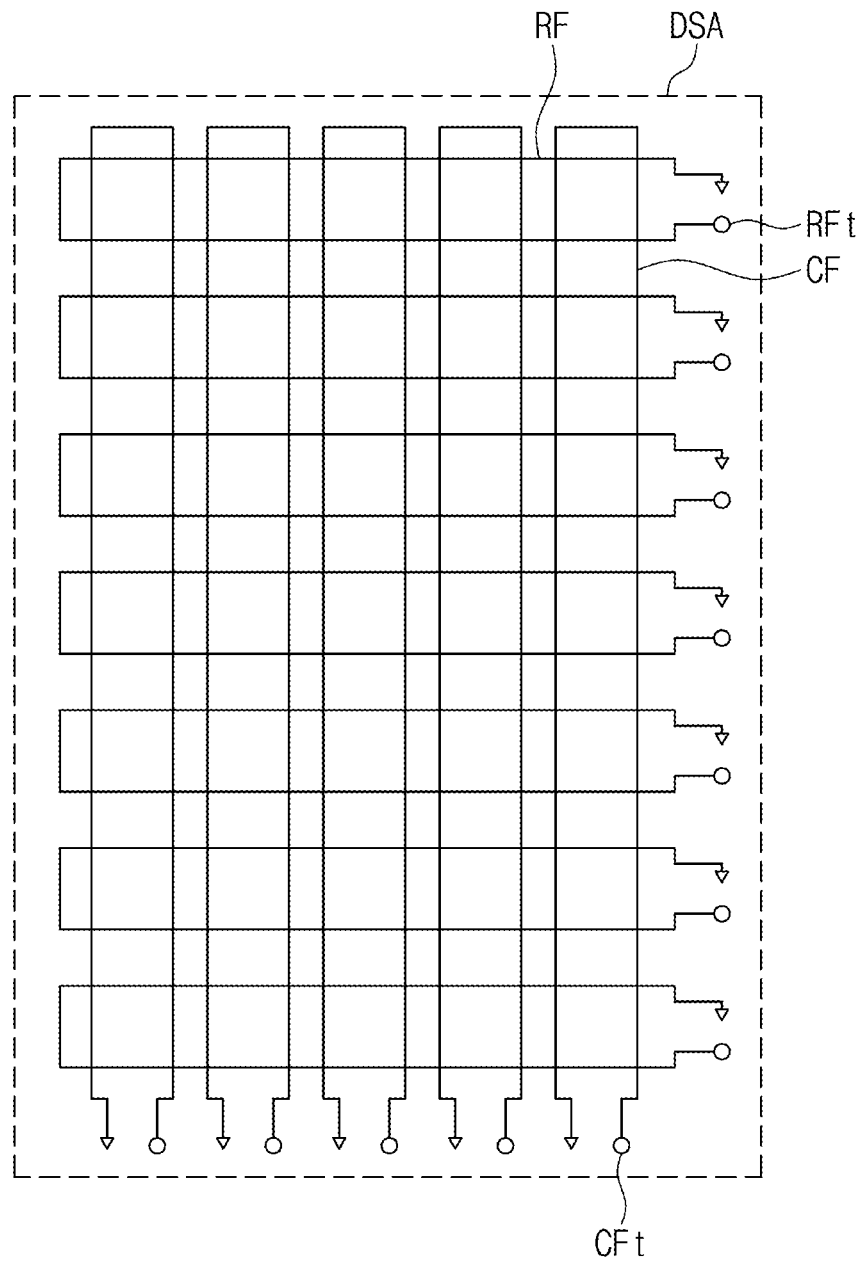
FIG. 6 is a schematic plan view of a sensing area of a digitizer, according to an embodiment.

FIG. 6 is a schematic plan view of a sensing area of a digitizer according to an embodiment. FIG. 6 illustrates the sensing coils included in the digitizers 200 and 200A described with reference to FIGS. 3 and 5.

The digitizers 200 and 200A (refer to FIGS. 3 and 5) according to an embodiment may include a plurality of first sensing coils CF and a plurality of second sensing coils RF. The first sensing coils CF and the second sensing coils RF may be referred to as driving coils and sensing coils, respectively, or vice versa.

In an embodiment, each of the first sensing coils CF may include long-side coils and a short-side coil. Each of the long-side coils may extend in the second direction DR2, and the long-side coils may be spaced apart from each other in the first direction DR1. The short-side coil may be connected to ends of the long-side coils that form one loop and may connect the long-side coils spaced apart from each other.

According to an embodiment, the short-side coil and the long-side coils may be disposed on different layers. In FIG. 6, the first sensing coils CF, each of which forms one loop, are illustrated as being spaced apart from each other. However, the invention is not limited thereto, and according to an embodiment, the long-side coils included in coils adjacent to each other among the first sensing coils CF may be alternately arranged.

In an embodiment, each of the second sensing coils RF may include long-side coils and a short-side coil. Each of the long-side coils may extend in the first direction DR1, and the long-side coils may be spaced apart from each other in the second direction DR2. The short-side coil may be connected to ends of the long-side coils that form one loop and may connect the long-side coils spaced apart from each other.

In an embodiment and referring to FIG. 6, the second sensing coils RF, each of which forms one loop, are illustrated as being spaced apart from each other. However, the invention is not limited thereto, and according to an embodiment, long-side coils included in coils adjacent to each other among the second sensing coils RF may be alternately arranged.

In an embodiment, AC signals may be sequentially provided to first terminals CFt of the first sensing coils CF. Terminals of the first sensing coils CF may be different from the first terminals CFt and may be grounded. Signal lines (not illustrated) may be connected to the first terminals CFt of the first sensing coils CF, respectively.

In an embodiment, when electric current flows through the first sensing coils CF, a line of magnetic force may be induced between the first sensing coils CF and the second sensing coils RF. The second sensing coils RF may sense an induced electromagnetic force emitted from a stylus pen and may output the sensed induced electromagnetic force to second terminals RFt of the second sensing coils RF as a sensing signal. Terminals of the second sensing coils RF may be different from the second terminals RFt and may be grounded. Signal lines (not illustrated) may be connected to the second terminals RFt of the second sensing coils RF, respectively.

According to an embodiment, the digitizer 200 described with reference to FIG. 3 may sense an input of a stylus pen even in the folding area FA since the above-described sensing coils CF and RF are disposed in the entire area of the digitizer 200, and the digitizer 200A (refer to FIG. 5) described with reference to FIG. 5 may separately sense an input of a stylus pen since the above-described sensing coils CF and RF are disposed in the first sensing part 210A and the second sensing part 220A, respectively.

Figure 7A:
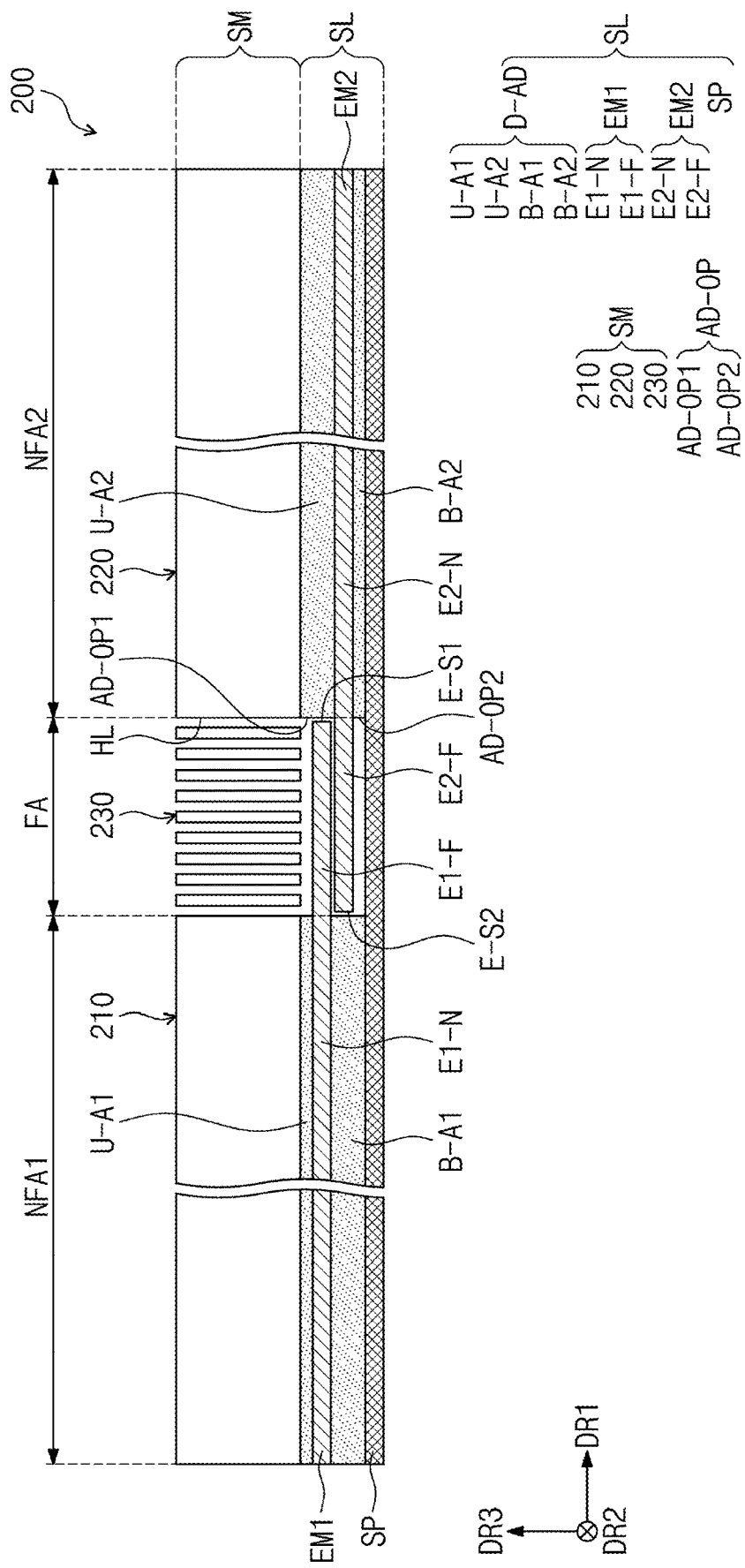
FIG. 7A is a cross sectional view of a digitizer, according to an embodiment.
Figure 7B:
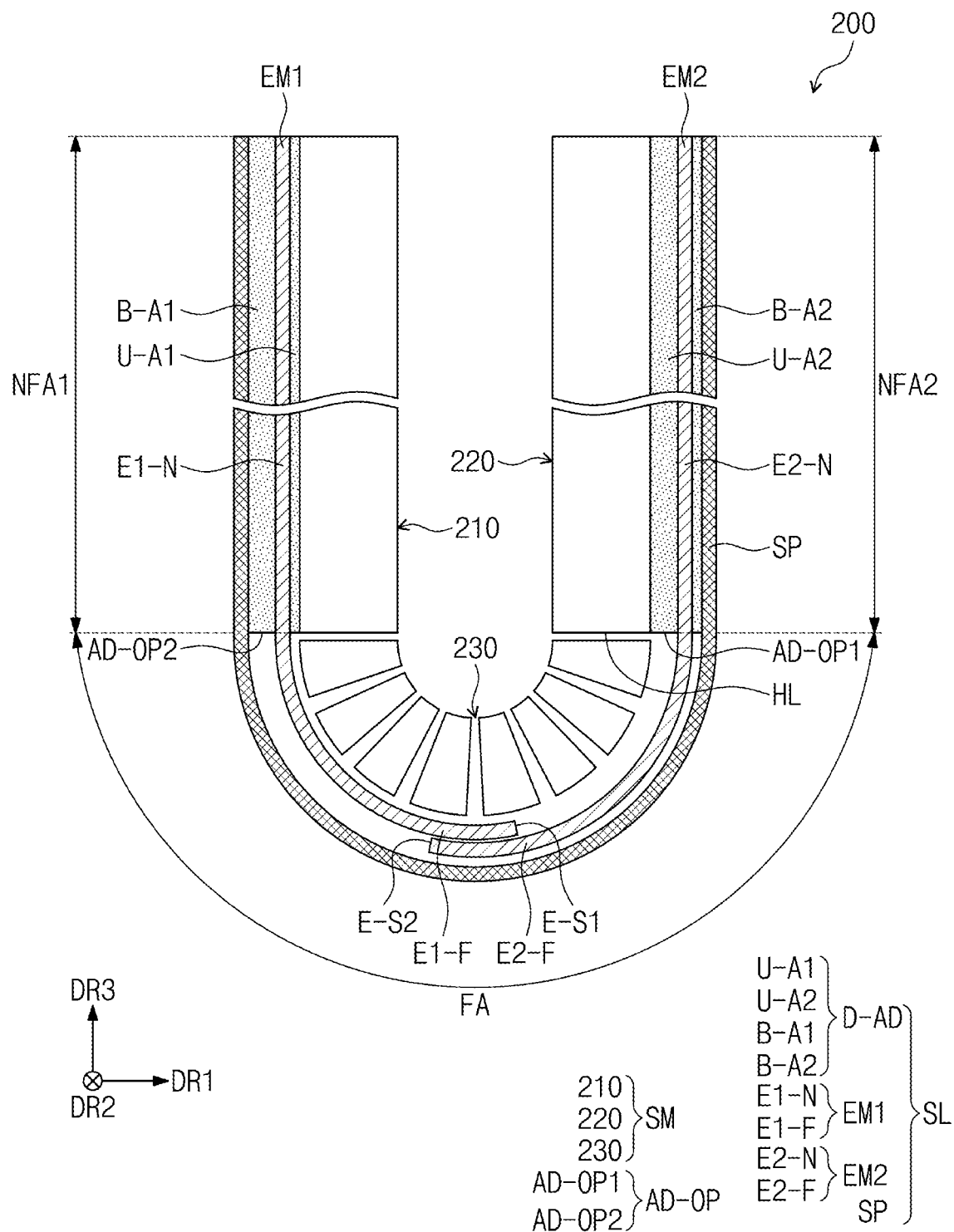
FIG. 7B is a cross sectional view illustrating a folded state of the digitizer, according to an embodiment.

FIG. 7A is a cross sectional view of a digitizer according to an embodiment. FIG. 7B is a cross sectional view illustrating a folded state of the digitizer according to an embodiment. Components identical or similar to the components described with reference to FIGS. 1A to 6 will be assigned with identical or similar reference numerals, and repetitive descriptions will hereinafter be omitted. FIG. 7A illustrates an unfolded state of the digitizer 200, and FIG. 7B illustrates a folded state of the digitizer 200.

In an embodiment and referring to FIGS. 7A and 7B, the digitizer 200 may include a sensing part SM and a shielding part SL.

In an embodiment, the sensing part SM may include a first non-folding part 210 overlapping a first non-folding area NFA1, a second non-folding part 220 overlapping a second non-folding area NFA2, and a folding part 230 that overlaps a folding area FA and that is disposed between the first non-folding part 210 and the second non-folding part 220. The folding part 230 may include holes HL formed through the folding part 230 in the third direction DR3. The holes HL may correspond to the folding area FA and may be spaced apart from each other in the first direction DR1 and the second direction DR2.

In an embodiment, the shielding part SL may include an adhesive layer D-AD, a first shielding layer EM1, a second shielding layer EM2, and a protective layer SP. The adhesive layer D-AD may include an opening AD-OP overlapping the folding area FA. The first shielding layer EM1 and the second shielding layer EM2 may be disposed inside the adhesive layer D-AD. The opening AD-OP may include a first opening AD-OP1 and a second opening AD-OP2.

In an embodiment, the adhesive layer D-AD may include a first upper adhesive layer U-A1, a first lower adhesive layer B-A1, a second upper adhesive layer U-A2, and a second lower adhesive layer B-A2. The first upper adhesive layer U-A1 may be disposed between the first shielding layer EM1 and the first non-folding part 210. The first lower adhesive layer B-A1 may be disposed between the first shielding layer EM1 and the protective layer SP.

In an embodiment, the second upper adhesive layer U-A2 may be disposed between the second shielding layer EM2 and the second non-folding part 220. The second lower adhesive layer B-A2 may be disposed between the second shielding layer EM2 and the protective layer SP.

In an embodiment, the first upper adhesive layer U-A1 and the second upper adhesive layer U-A2 may be spaced apart from each other with the folding area FA therebetween to form the first opening AD-OP1, and the first lower adhesive layer B-A1 and the second lower adhesive layer B-A2 may be spaced apart from each other with the folding area FA therebetween to form the second opening AD-OP2.

In an embodiment, the first shielding layer EM1 may include a first non-folding portion E1-N overlapping the first non-folding part 210 and a first folding portion E1-F overlapping the folding part 230.

In an embodiment, the second shielding layer EM2 may include a second non-folding portion E2-N overlapping the second non-folding part 220 and a second folding portion E2-F overlapping the folding part 230. The first folding portion E1-F and the second folding portion E2-F may be exposed from the adhesive layer D-AD by the opening AD-OP.

In an embodiment, the protective layer SP may be disposed under the adhesive layer D-AD. The protective layer SP may overlap the first non-folding area NFA1, the folding area FA, and the second non-folding area NFA2.

According to an embodiment, in the unfolded state of the digitizer 200, an end E-S1 of the first folding portion E1-F may face a side surface of the second upper adhesive layer U-A2 that defines the first opening AD-OP1, and an end E-S2 of the second folding portion E2-F may face a side surface of the first lower adhesive layer B-A1 that defines the second opening AD-OP2.

In an embodiment, when the digitizer 200 is folded, the first folding portion E1-F and the second folding portion E2-F may be bent with a predetermined curvature. When the digitizer 200 is folded, the end E-S1 of the first folding portion E1-F may move away from the side surface of the second upper adhesive layer U-A2 that defines the first opening AD-OP1, and the end E-S2 of the second folding portion E2-F may move away from the side surface of the first lower adhesive layer B-A1 that defines the second opening AD-OP2.

In an embodiment, even when the digitizer 200 is fully folded, part of the first folding portion E1-F and part of the second folding portion E2-F may overlap each other. Accordingly, the first folding portion E1-F and the second folding portion E2-F may block infiltration of foreign matter into the holes HL of the folding part 230, and the shielding performance of the shielding part SL may be maintained even when the digitizer 200 is folded.

In an embodiment, when the digitizer 200 is folded, the first folding portion E1-F and the second folding portion E2-F may slide within the opening AD-OP. In this case, the protective layer SP may be disposed under the adhesive layer D-AD and may prevent separation of the first folding portion E1-F and the second folding portion E2-F.

In addition, in an embodiment, as compared with when a shielding part is implemented with a single shielding layer, a problem of cracks in the shielding layers EM1 and EM2 may be improved since the shielding layers EM1 and EM2 disposed on different layers slide within the opening AD-OP. Accordingly, the electronic device 1000 (refer to FIG. 1A) including the digitizer 200 having improved shielding performance and sensing performance may be provided.

Figure 9:
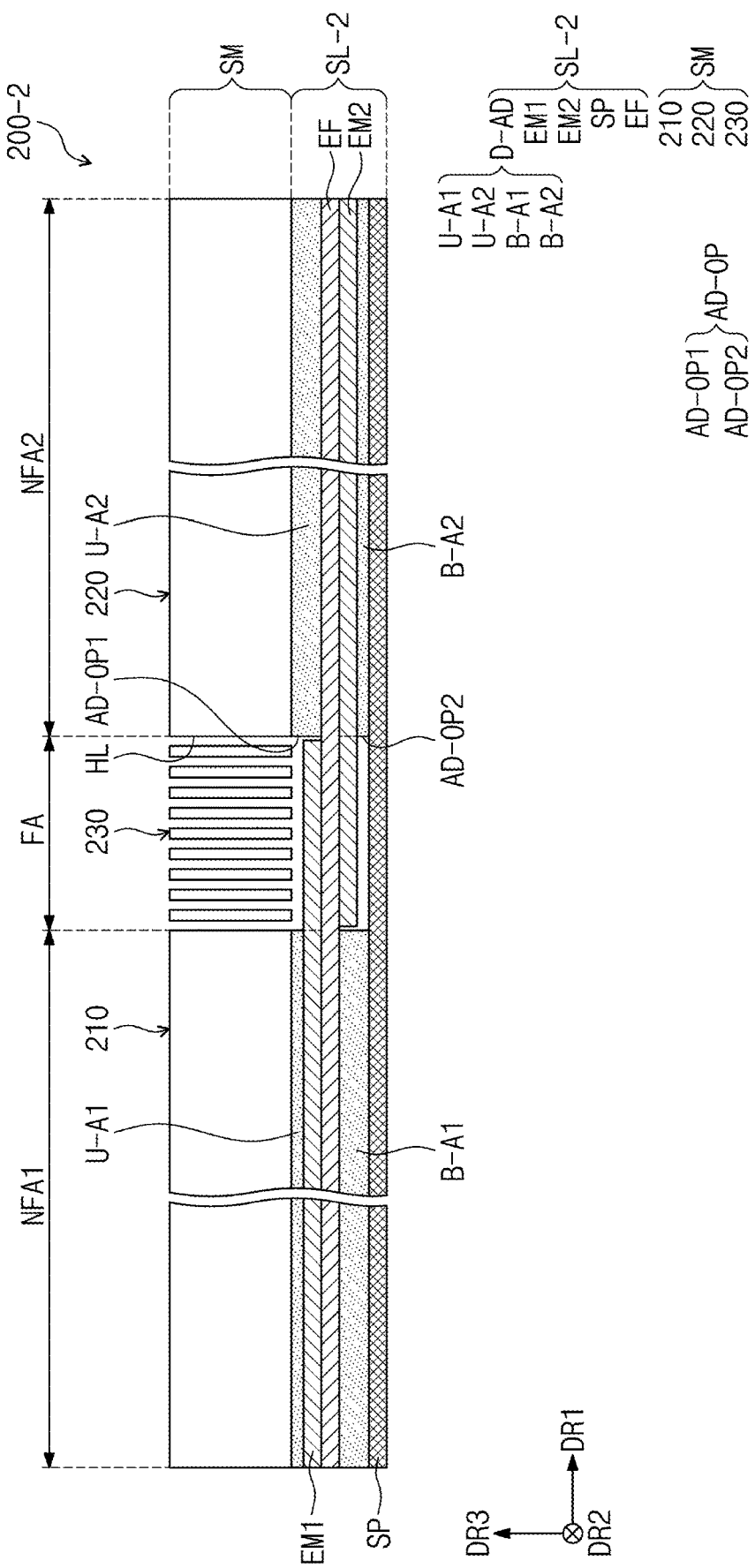
FIG. 9 is a cross sectional view of a digitizer, according to an embodiment.
Figure 10:
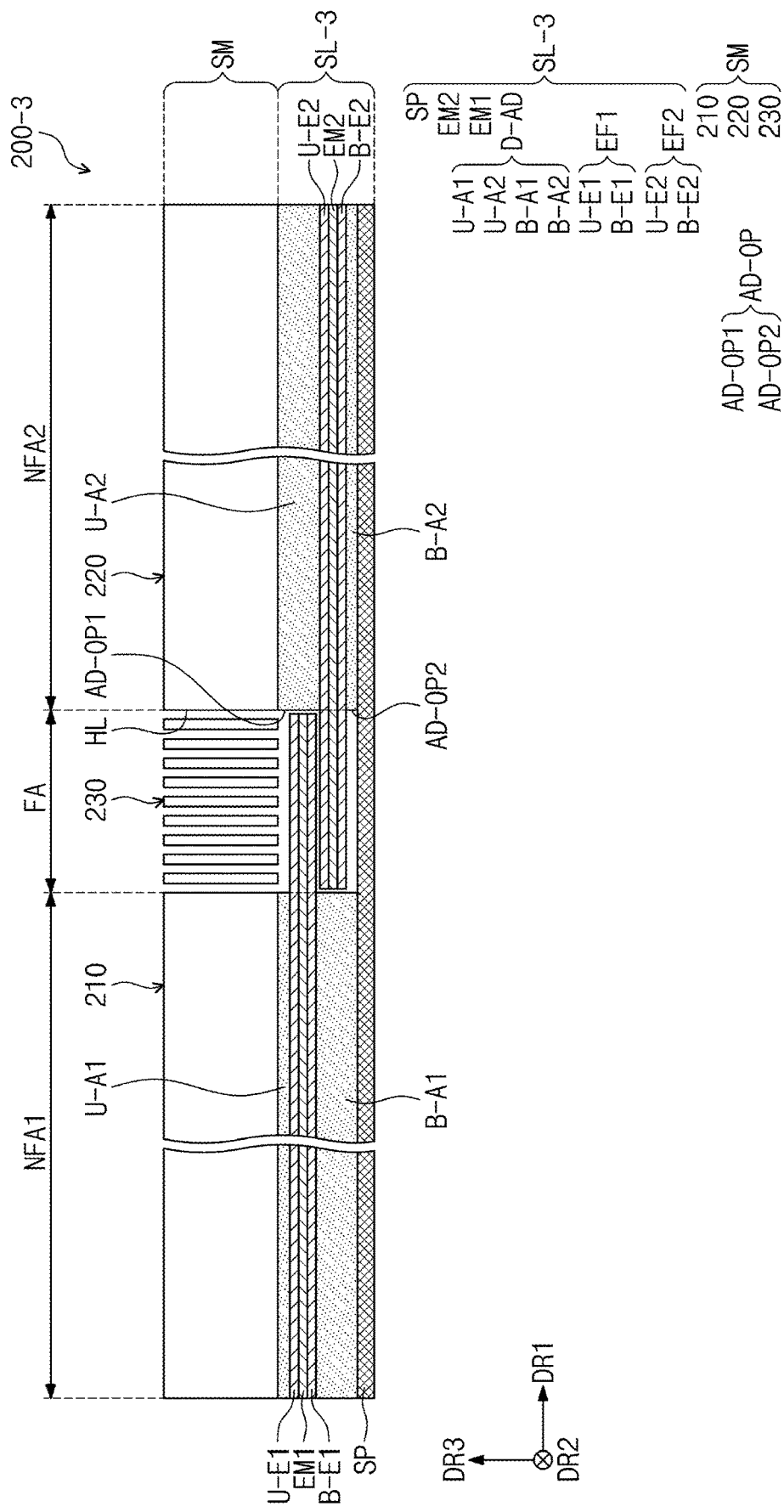
FIG. 10 is a cross sectional view of a digitizer, according to an embodiment.
Figure 11:
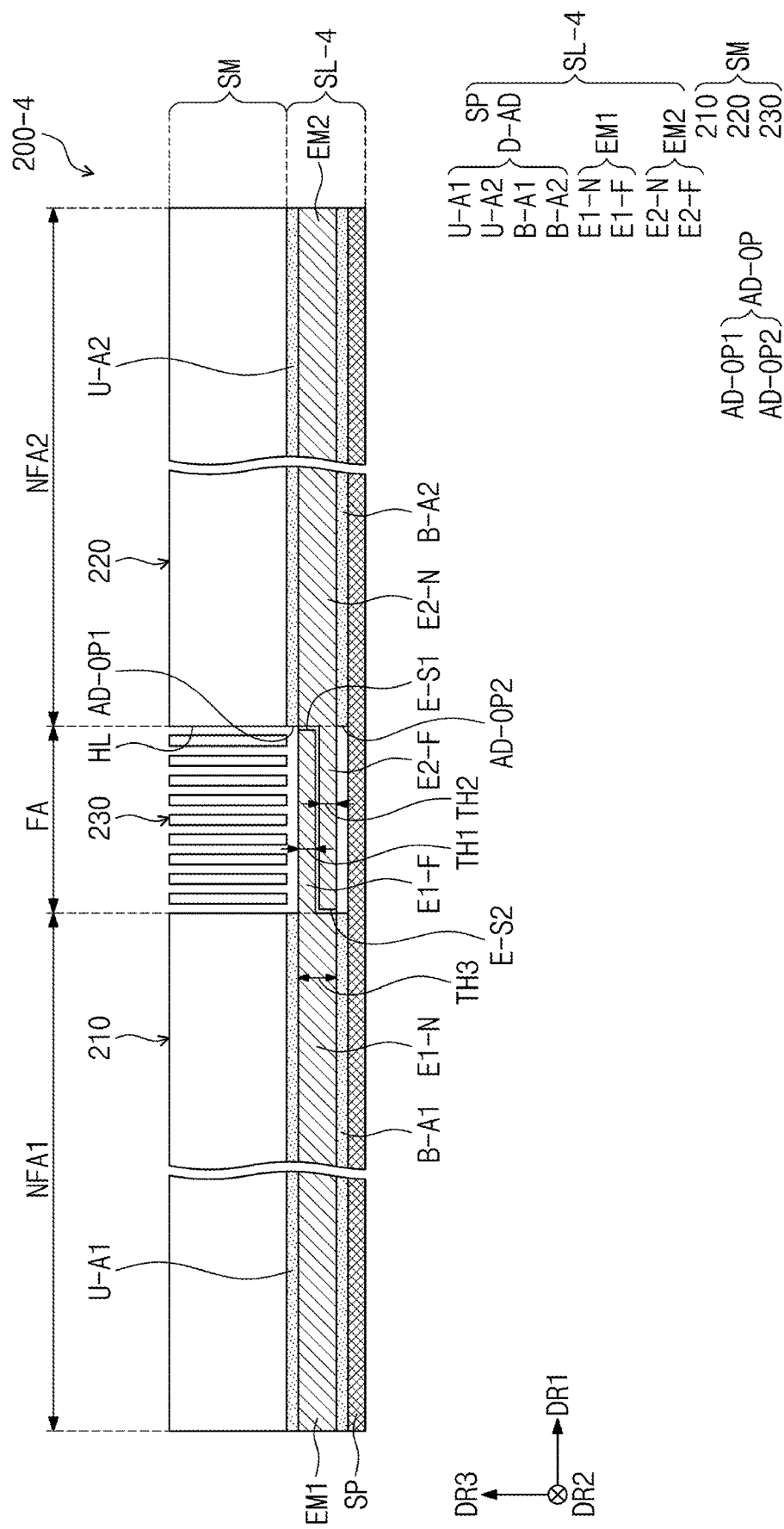
FIG. 11 is a cross sectional view of a digitizer, according to an embodiment.
Figure 12:
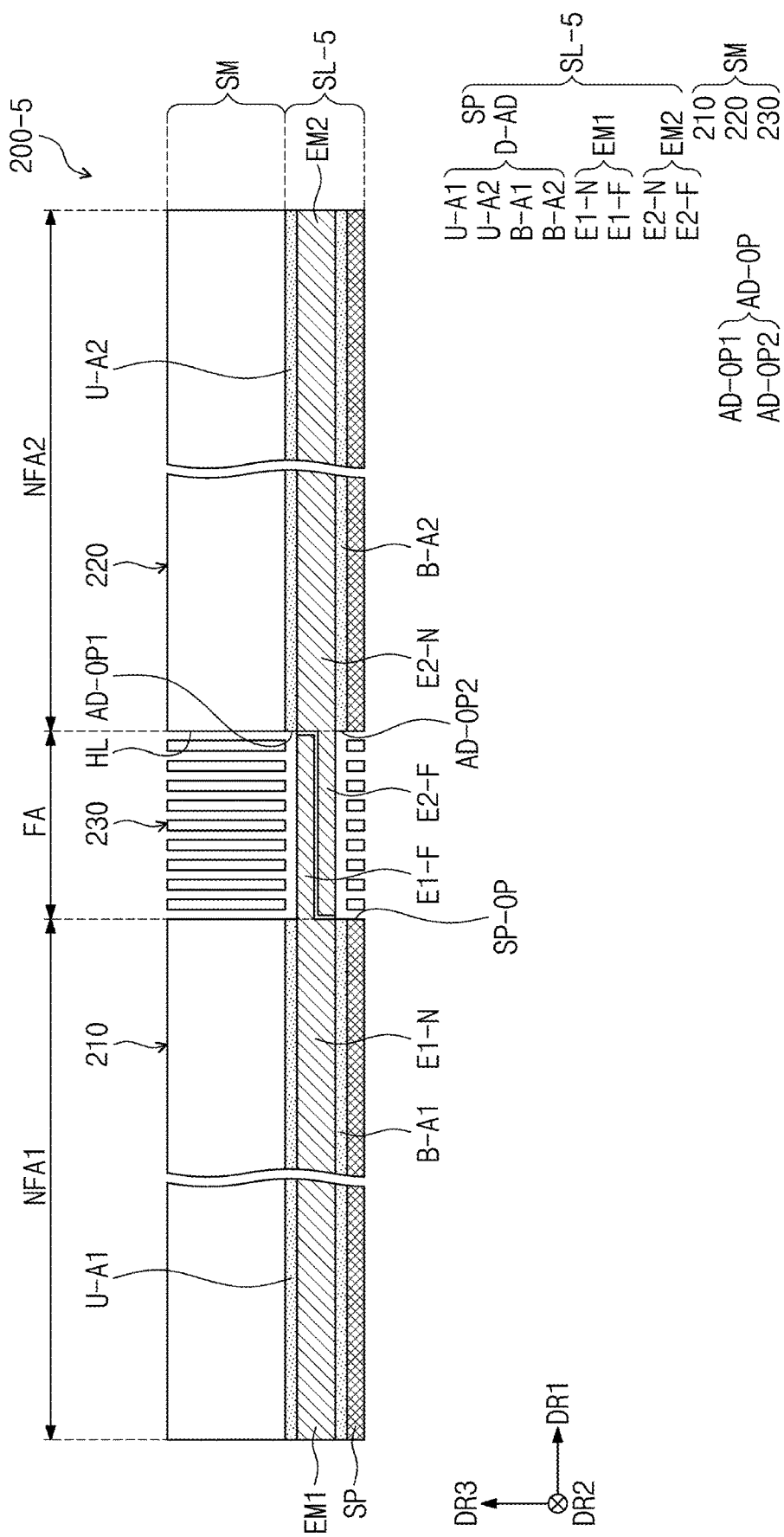
FIG. 12 is a cross sectional view of a digitizer according to an embodiment.
Figure 13:
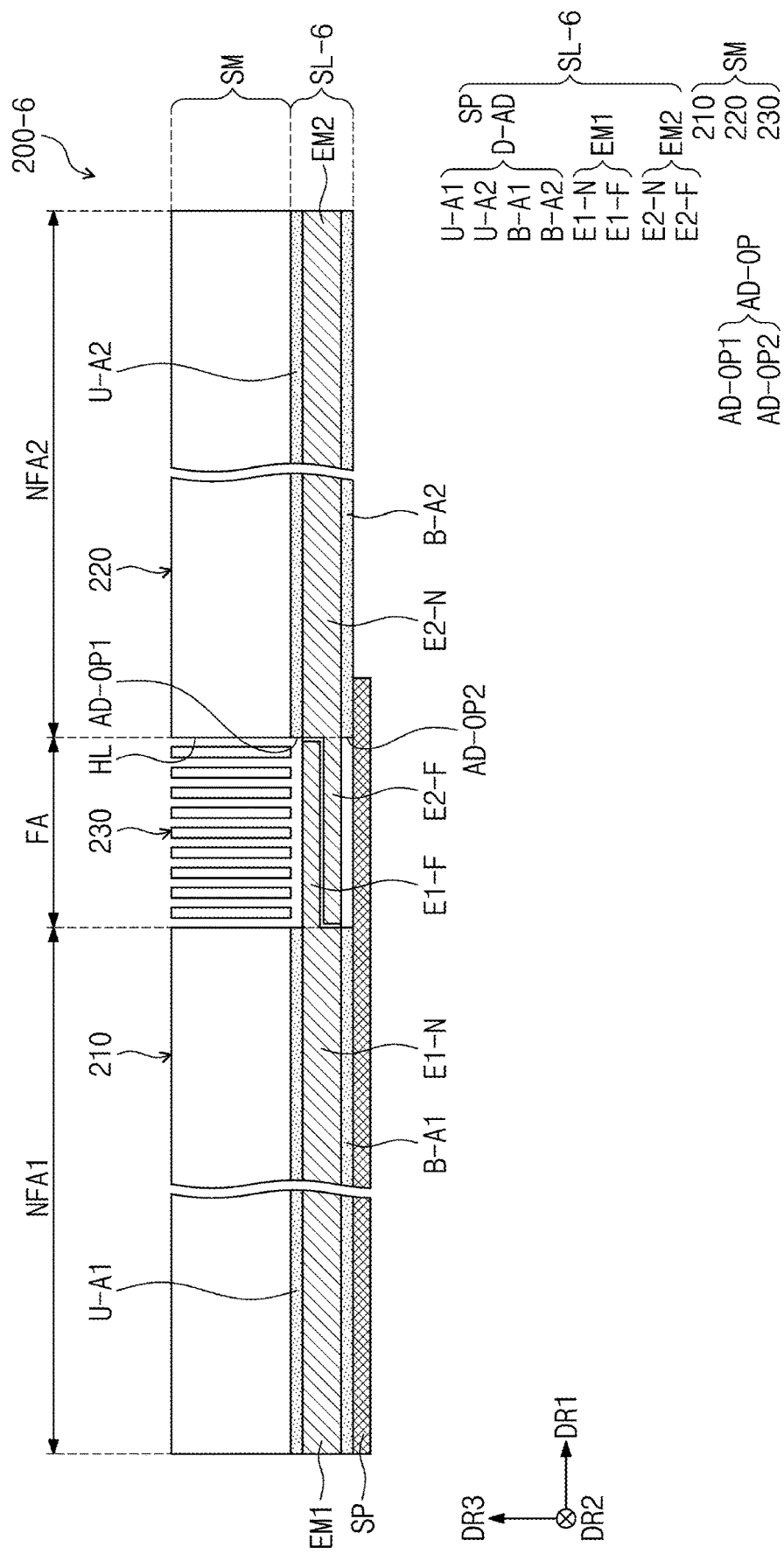
FIG. 13 is a cross sectional view of a digitizer, according to an embodiment.

FIG. 8 is a cross sectional view of a digitizer according to an embodiment. FIG. 9 is a cross sectional view of a digitizer according to an embodiment. FIG. 10 is a cross sectional view of a digitizer according to an embodiment. FIG. 11 is a cross sectional view of a digitizer according to an embodiment. FIG. 12 is a cross sectional view of a digitizer according to an embodiment. FIG. 13 is a cross sectional view of a digitizer according to an embodiment. Components identical or similar to the components illustrated in FIGS. 1A to 7B will be assigned with identical or similar reference numerals, and repetitive descriptions will hereinafter be omitted.

Referring to FIG. 8, the digitizer 200-1 according to an embodiment may include a sensing part SM and a shielding part SL-1.

In an embodiment, the sensing part SM may include a first non-folding part 210 overlapping a first non-folding area NFA1, a second non-folding part 220 overlapping a second non-folding area NFA2, and a folding part 230 that overlaps a folding area FA and that is disposed between the first non-folding part 210 and the second non-folding part 220.

The folding part 230 may include holes HL formed through the folding part 230 in the third direction DR3. The holes HL may correspond to the folding area FA and may be spaced apart from each other in the first direction DR1 and the second direction DR2.

In an embodiment, the shielding part SL-1 may include an adhesive layer D-AD, a first shielding layer EM1, a second shielding layer EM2, and a protective layer SP. The adhesive layer D-AD may include an opening AD-OP overlapping the folding area FA. The first shielding layer EM1 and the second shielding layer EM2 may be disposed inside the adhesive layer D-AD. The opening AD-OP may include a first opening AD-OP1 and a second opening AD-OP2.

In an embodiment, the adhesive layer D-AD may include a first upper adhesive layer U-A1, a first lower adhesive layer B-A1, a second upper adhesive layer U-A2, and a second lower adhesive layer B-A2. The first upper adhesive layer U-A1 may be disposed between the first shielding layer EM1 and the first non-folding part 210. The first lower adhesive layer B-A1 may be disposed between the first shielding layer EM1 and the protective layer SP.

In an embodiment, the second upper adhesive layer U-A2 may be disposed between the second shielding layer EM2 and the second non-folding part 220. The second lower adhesive layer B-A2 may be disposed between the second shielding layer EM2 and the protective layer SP.

In an embodiment, the first upper adhesive layer U-A1 and the second upper adhesive layer U-A2 may be spaced apart from each other with the folding area FA therebetween to form the first opening AD-OP1, and the first lower adhesive layer B-A1 and the second lower adhesive layer B-A2 may be spaced apart from each other with the folding area FA therebetween to form the second opening AD-OP2.

In an embodiment, the first shielding layer EM1 may include a first non-folding portion E1-N overlapping the first non-folding part 210 and a first folding portion E1-F overlapping the folding part 230.

In an embodiment, the second shielding layer EM2 may include a second non-folding portion E2-N overlapping the second non-folding part 220 and a second folding portion E2-F overlapping the folding part 230. The first folding portion E1-F and the second folding portion E2-F may be exposed from the adhesive layer D-AD by the opening AD-OP.

According to an embodiment, the shielding part SL-1 may further include a first coating layer CL1 disposed on at least one of an upper surface and a lower surface of the first folding portion E1-F. In addition, the shielding part SL-1 may further include a second coating layer CL2 disposed on at least one of an upper surface and a lower surface of the second folding portion E2-F.

In an embodiment, the first and second coating layers CL1 and CL2 may prevent the first folding portion E1-F and the second folding portion E2-F from being worn by friction when the first folding portion E1-F and the second folding portion E2-F slide within the opening AD-OP. The first and second coating layers CL1 and CL2 may be formed by performing a release coating process.

Referring to FIG. 9, the digitizer 200-2 according to an embodiment may include a sensing part SM and a shielding part SL-2.

In an embodiment, the sensing part SM may include a first non-folding part 210 overlapping a first non-folding area NFA1, a second non-folding part 220 overlapping a second non-folding area NFA2, and a folding part 230 that overlaps a folding area FA and that is disposed between the first non-folding part 210 and the second non-folding part 220. The folding part 230 may include holes HL formed through the folding part 230 in the third direction DR3. The holes HL may correspond to the folding area FA and may be spaced apart from each other in the first direction DR1 and the second direction DR2.

In an embodiment, the shielding part SL-2 may include an adhesive layer D-AD, a first shielding layer EM1, a second shielding layer EM2, and a protective layer SP. The shielding part SL-2 according to an embodiment may further include a reinforcing layer EF.

In an embodiment, the reinforcing layer EF may be disposed between the first shielding layer EM1 and the second shielding layer EM2. The reinforcing layer EF may overlap the first shielding layer EM1 and the second shielding layer EM2 over the entirety of the first non-folding area NFA1, the folding area FA, and the second non-folding area NFA2.

In an embodiment, the reinforcing layer EF may include one of polyimide and an elastomer. When the reinforcing layer EF includes polyimide, the rigidity of the digitizer 200-2 may be improved, and when the reinforcing layer EF includes an elastomer, the elasticity of the digitizer 200-2 may be improved.

In an embodiment, the adhesive layer D-AD may include a first upper adhesive layer U-A1, a first lower adhesive layer B-A1, a second upper adhesive layer U-A2, and a second lower adhesive layer B-A2. The first upper adhesive layer U-A1 may be disposed between the first shielding layer EM1 and the first non-folding part 210. The first lower adhesive layer B-A1 may be disposed between the first shielding layer EM1 and the protective layer SP.

In an embodiment, the second upper adhesive layer U-A2 may be disposed between the second shielding layer EM2 and the second non-folding part 220. The second lower adhesive layer B-A2 may be disposed between the second shielding layer EM2 and the protective layer SP.

According to an embodiment, the adhesive layer D-AD may further include additional adhesive layers disposed between the reinforcing layer EF and the first shielding layer EM1 and between the reinforcing layer EF and the second shielding layer EM2.

Referring to FIG. 10, the digitizer 200-3 according to an embodiment may include a sensing part SM and a shielding part SL-3.

In an embodiment, the sensing part SM may include a first non-folding part 210 overlapping a first non-folding area NFA1, a second non-folding part 220 overlapping a second non-folding area NFA2, and a folding part 230 that overlaps a folding area FA and that is disposed between the first non-folding part 210 and the second non-folding part 220. The folding part 230 may include holes HL formed through the folding part 230 in the third direction DR3. The holes HL may correspond to the folding area FA and may be spaced apart from each other in the first direction DR1 and the second direction DR2.

In an embodiment, the shielding part SL-3 may include an adhesive layer D-AD, a first shielding layer EM1, a second shielding layer EM2, and a protective layer SP. The shielding part SL-3 according to an embodiment may further include first and second reinforcing layers EF1 and EF2, respectively.

In an embodiment, the first reinforcing layer EF1 may include a first upper reinforcing layer U-E1 and a first lower reinforcing layer B-EL. The first upper reinforcing layer U-E1 may be disposed on the first shielding layer EM1, and the first lower reinforcing layer B-E1 may be disposed under the first shielding layer EM1.

In an embodiment, the second reinforcing layer EF2 may include a second upper reinforcing layer U-E2 and a second lower reinforcing layer B-E2. The second upper reinforcing layer U-E2 may be disposed on the second shielding layer EM2, and the second lower reinforcing layer B-E2 may be disposed under the second shielding layer EM2.

In an embodiment, each of the first and second reinforcing layers EF1 and EF2 may include one of polyimide and an elastomer. When the first and second reinforcing layers EF1 and EF2 include polyimide, the rigidity of the digitizer 200-3 may be improved, and when the first and second reinforcing layers EF1 and EF2 include an elastomer, the elasticity of the digitizer 200-3 may be improved.

According to an embodiment, the upper reinforcing layers U-E1 and U-E2 and the lower reinforcing layers B-E1 and B-E2 may include different materials. For example, the upper reinforcing layers U-E1 and U-E2 and the lower reinforcing layers B-E1 and B-E2 may include polyimide and an elastomer, respectively, or vice versa and are not limited to any one embodiment.

In an embodiment, the adhesive layer D-AD may include a first upper adhesive layer U-A1, a first lower adhesive layer B-A1, a second upper adhesive layer U-A2, and a second lower adhesive layer B-A2. The first upper adhesive layer U-A1 may be disposed between the first upper reinforcing layer U-E1 and the first non-folding part 210. The first lower adhesive layer B-A1 may be disposed between the first lower reinforcing layer B-E1 and the protective layer SP.

In an embodiment, the second upper adhesive layer U-A2 may be disposed between the second upper reinforcing layer U-E2 and the second non-folding part 220. The second lower adhesive layer B-A2 may be disposed between the second lower reinforcing layer B-E2 and the protective layer SP.

Referring to FIG. 11, the digitizer 200-4 according to an embodiment may include a sensing part SM and a shielding part SL-4.

In an embodiment, the sensing part SM may include a first non-folding part 210 overlapping a first non-folding area NFA1, a second non-folding part 220 overlapping a second non-folding area NFA2, and a folding part 230 that overlaps a folding area FA and that is disposed between the first non-folding part 210 and the second non-folding part 220. The folding part 230 may include holes HL formed through the folding part 230 in the third direction DR3. The holes HL may correspond to the folding area FA and may be spaced apart from each other in the first direction DR1 and the second direction DR2.

In an embodiment, the shielding part SL-4 may include an adhesive layer D-AD, a first shielding layer EM1, a second shielding layer EM2, and a protective layer SP. The adhesive layer D-AD may include an opening AD-OP overlapping the folding area FA. The first shielding layer EM1 and the second shielding layer EM2 may be disposed inside the adhesive layer D-AD.

In an embodiment, the first shielding layer EM1 may include a first non-folding portion E1-N overlapping the first non-folding part 210 and a first folding portion E1-F overlapping the folding part 230.

In an embodiment, the second shielding layer EM2 may include a second non-folding portion E2-N overlapping the second non-folding part 220 and a second folding portion E2-F overlapping the folding part 230. The first folding portion E1-F and the second folding portion E2-F may make contact with each other in the folding area FA. The first folding portion E1-F and the second folding portion E2-F may be exposed from the adhesive layer D-AD by the opening AD-OP.

According to an embodiment, an upper surface of the first shielding layer EM1 and an upper surface of the second shielding layer EM2 may define the same plane, and a lower surface of the first shielding layer EM1 and a lower surface of the second shielding layer EM2 may define the same plane.

In an embodiment, the first thickness TH1 of the first folding portion E1-F and the second thickness TH2 of the second folding portion E2-F may be smaller than the third thickness TH3 of the first non-folding portion E1-N (or, the thickness of the second non-folding portion E2-N). In addition, the sum of the first thickness TH1 and the second thickness TH2 may be smaller than the third thickness TH3.

According to an embodiment, an end E-S1 of the first folding portion E1-F may face a side surface of the second non-folding portion E2-N that is adjacent to the folding area FA, and an end E-S2 of the second folding portion E2-F may face a side surface of the first non-folding portion E1-N that is adjacent to the folding area FA.

According to an embodiment, the first shielding layer EM1 and the second shielding layer EM2 may have stepped portions, respectively, and the stepped portions may be disposed to face each other in the folding area FA. Accordingly, the upper surfaces of the first shielding layer EM1 and the second shielding layer EM2 may define the same plane, and the lower surfaces of the first shielding layer EM1 and the second shielding layer EM2 may define the same plane.

Thus, the electronic device 1000 (refer to FIG. 1A) including the slim digitizer 200-4 may be provided according to an embodiment.

Referring to FIG. 12, the digitizer 200-5 according to an embodiment may include a sensing part SM and a shielding part SL-5. The following description will be focused on a difference between the digitizer 200-5 illustrated in FIG. 12 and the digitizer 200-4 illustrated in FIG. 11.

A protective layer SP of the shielding part SL-5 according to an embodiment may include reinforcing openings SP-OP overlapping a folding area FA. The reinforcing openings SP-OP may be formed through at least a portion of the protective layer SP. The shape of the protective layer SP overlapping the folding area FA, except for the reinforcing openings SP-OP, may have a mesh shape or a grid shape on a plane. In addition, the reinforcing openings SP-OP may have a shape corresponding to holes HL included in a folding part 230 of the sensing part SM and are not limited to any one embodiment.

Referring to FIG. 13, the digitizer 200-6 according to an embodiment may include a sensing part SM and a shielding part SL-6. The following description will be focused on a difference between the digitizer 200-6 illustrated in FIG. 13 and the digitizer 200-4 illustrated in FIG. 11.

The shielding part SL-6 according to an embodiment may overlap a first non-folding area NFA1, a folding area FA, and a partial region of a second non-folding area NFA2 and may not overlap the remaining region of the second non-folding area NFA2.

The shielding part SL-6 according to an embodiment may be provided such that an end of a second shielding layer EM2 is not exposed to the outside when the digitizer 200-6 slides as in FIG. 7.

According to the embodiments of the invention, the digitizer may include the shielding part that slides when the electronic device is folded. Accordingly, the electronic device including the digitizer having improved shielding performance and sensing performance may be provided.

Although the present disclosure has been described with reference to embodiments of the invention, it will be understood that the invention should not be limited to these embodiments but various changes and modifications can be made by those skilled in the art without departing from the spirit and scope of the present disclosure. Accordingly, the technical scope of the invention is not intended to be limited to the contents set forth in the detailed description of the specification, but is intended to be defined by the appended claims. Moreover, the embodiments or parts of the embodiments may be combined in whole or in part without departing from the scope of the invention.

What is claimed is:

1. An electronic device comprising:
    a display module including a folding area folded about a folding axis and a first non-folding area and a second non-folding area spaced apart from each other with the folding area disposed therebetween; and
    a digitizer disposed under the display module, the digitizer including a sensing part to sense an external input and a shielding part disposed under the sensing part, wherein the sensing part includes a plurality of sensing coils,
    wherein the shielding part includes:
    an adhesive layer including an opening overlapping the folding area;
    a first shielding layer disposed inside the adhesive layer, the first shielding layer including a first folding portion overlapping the folding area and a first non-folding portion overlapping the first non-folding area;
    a second shielding layer disposed inside the adhesive layer, the second shielding layer including a second folding portion overlapping the folding area and a second non-folding portion overlapping the second non-folding area; and
    a protective layer disposed under the adhesive layer,
    wherein the first folding portion and the second folding portion overlap each other and are exposed by the opening.

2. The electronic device of claim 1, wherein when the folding area is folded, each of the first folding portion and the second folding portion is bent with a predetermined curvature, and a part of the first folding portion and a part of the second folding portion overlap each other.

3. The electronic device of claim 1, wherein the adhesive layer includes:
    a first upper adhesive layer overlapping the first non-folding area and disposed between the first folding portion and the sensing part;
    a first lower adhesive layer overlapping the first non-folding area and disposed between the first folding portion and the protective layer;
    a second upper adhesive layer overlapping the second non-folding area and disposed between the second folding portion and the sensing part; and
    a second lower adhesive layer overlapping the second non-folding area and disposed between the second folding portion and the protective layer, and
    wherein the opening includes a first opening defined between the first upper adhesive layer and the second upper adhesive layer and a second opening defined between the first lower adhesive layer and the second lower adhesive layer.

4. The electronic device of claim 3, wherein when the folding area is folded, an end of the first folding portion moves away from a side surface of the second upper adhesive layer defining the first opening, and an end of the second folding portion moves away from a side surface of the first lower adhesive layer defining the second opening.

5. The electronic device of claim 1, wherein at least one of an upper surface of the first folding portion facing the sensing part and a lower surface of the first folding portion face the second folding portion includes a first coating layer formed by performing a release coating process, and
    wherein at least one of an upper surface of the second folding portion facing the first folding portion and a lower surface of the second folding portion facing the protective layer includes a second coating layer formed by performing the release coating process.

6. The electronic device of claim 1, further comprising:
    a reinforcing layer disposed between the first shielding layer and the second shielding layer and overlapping the first non-folding area, the folding area, and the second non-folding area.

7. The electronic device of claim 6, wherein the reinforcing layer includes one of polyimide and an elastomer.

8. The electronic device of claim 1, further comprising:
    a first upper reinforcing layer disposed on an upper surface of the first shielding layer;
    a first lower reinforcing layer disposed on a lower surface of the first shielding layer;
    a second upper reinforcing layer disposed on an upper surface of the second shielding layer; and
    a second lower reinforcing layer disposed on a lower surface of the second shielding layer.

9. The electronic device of claim 8, wherein the first upper reinforcing layer, the first lower reinforcing layer, the second upper reinforcing layer, and the second lower reinforcing layer include one of polyimide and an elastomer.

10. The electronic device of claim 1, wherein the first folding portion has a smaller thickness than the first non-folding portion, and
    wherein the second folding portion has a smaller thickness than the second non-folding portion.

11. The electronic device of claim 10, wherein an end of the first folding portion faces a side surface of the second non-folding portion disposed adjacent to the folding area, and
    wherein an end of the second folding portion faces a side surface of the first non-folding portion disposed adjacent to the folding area.

12. The electronic device of claim 11, wherein the protective layer includes holes overlapping the folding area and formed through the protective layer.

13. The electronic device of claim 1, wherein the protective layer overlaps the folding area, the first non-folding area, and a portion of the second non-folding area adjacent to a boundary of the folding area, and
    wherein the protective layer does not overlap the remaining portion of the second non-folding area.

14. The electronic device of claim 1, wherein the first shielding layer and the second shielding layer include one of a magnetic metal powder (MMP), a ferrite, invar, a stainless steel, an Fe—Si—Al based alloy, and a Ni—Fe based alloy.

15. The electronic device of claim 1, wherein when the folding area is folded with a predetermined radius of curvature, the predetermined radius of curvature is greater than a gap between the first non-folding area and the second non-folding area.

16. The electronic device of claim 15, wherein the sensing part includes:

a first non-folding part overlapping the first non-folding area;
a second non-folding part overlapping the second non-folding area; and
a folding part overlapping the folding area and disposed between the first non-folding part and the second non-folding part, the folding part including holes formed through at least a portion of the folding part.

17. The electronic device of claim 15, wherein the sensing part includes:
a first sensing part overlapping the first non-folding area and a portion of the folding area; and
a second sensing part overlapping the second non-folding area and a portion of the folding area,
wherein the first sensing part and the second sensing part are spaced apart from each other in the folding area.

18. The electronic device of claim 16, further comprising:
an upper plate disposed between the display module and the digitizer, the upper plate having holes defined therein to overlap the folding area.

19. The electronic device of claim 1, wherein the protective layer includes one of a stainless steel, a polyimide, and an elastomer.

20. The electronic device of claim 1, wherein the digitizer senses the external input in an electromagnetic resonance (EMR) type.

* * * * *